United States Patent
Dudar

(10) Patent No.: US 11,035,307 B2
(45) Date of Patent: Jun. 15, 2021

(54) SYSTEMS AND METHODS FOR REDUCING VEHICLE VALVE DEGRADATION

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 144 days.

(21) Appl. No.: 16/188,910

(22) Filed: Nov. 13, 2018

(65) Prior Publication Data
US 2020/0149482 A1 May 14, 2020

(51) Int. Cl.
*F02D 41/00* (2006.01)
*F02M 25/08* (2006.01)
*B60K 15/035* (2006.01)
*B60K 15/03* (2006.01)

(52) U.S. Cl.
CPC ...... *F02D 41/004* (2013.01); *B60K 15/03504* (2013.01); *B60K 15/03519* (2013.01); *F02D 41/0045* (2013.01); *F02M 25/089* (2013.01); *F02M 25/0836* (2013.01); *B60K 2015/03296* (2013.01); *B60K 2015/03514* (2013.01)

(58) Field of Classification Search
CPC ........ B60K 15/03504; B60K 15/03519; B60K 2015/03296; B60K 2015/03302; B60K 2015/03514; F02D 41/004; F02D 41/0045; F02M 25/0836; F02M 25/089
See application file for complete search history.

(56) References Cited

U.S. PATENT DOCUMENTS

| | | | |
|---|---|---|---|
| 4,630,581 A | 12/1986 | Shibata | |
| 5,031,450 A | 7/1991 | Nakaniwa et al. | |
| 5,351,193 A | 9/1994 | Poirier et al. | |
| 5,413,082 A | 5/1995 | Cook et al. | |
| 5,442,551 A * | 8/1995 | Denz | B60K 15/03504 123/198 D |
| 5,544,638 A * | 8/1996 | Yuda | F02D 41/0045 123/674 |
| 5,571,003 A | 11/1996 | Tuckey | |

(Continued)

OTHER PUBLICATIONS

Dudar, A. et al., "Systems and Methods for Onboard Canister Purge Valve Flow Mapping," U.S. Appl. No. 15/987,028, filed May 23, 2018, 130 pages.

(Continued)

*Primary Examiner* — Carl C Staubach
(74) *Attorney, Agent, or Firm* — Geoffrey Brumbaugh; McCoy Russell LLP

(57) ABSTRACT

Methods and systems are provided for reducing degradation and issues related to noise, vibration and harshness (NVH) for a canister purge valve. In one example, a method may include sequentially increasing a duty cycle of a canister purge valve over a course of a purging operation to purge fuel vapors stored in a fuel vapor canister to an intake of an engine, while timing opening and closing events of the canister purge valve to coincide with pressure differences lower than a threshold in terms of pressure oscillations across the canister purge valve. In this way, purging of the canister may be efficient while additionally reducing degradation and NVH issues related to the CPV.

12 Claims, 15 Drawing Sheets

(56) References Cited

U.S. PATENT DOCUMENTS

| | | | |
|---|---|---|---|
| 5,572,980 A * | 11/1996 | Nakagawa | F02D 41/004 |
| | | | 123/520 |
| 5,609,135 A | 3/1997 | Ogawa et al. | |
| 5,649,687 A | 7/1997 | Rosas et al. | |
| 6,085,731 A | 7/2000 | Duty | |
| 6,138,655 A | 10/2000 | Kerns et al. | |
| 6,234,141 B1 | 5/2001 | Kerns et al. | |
| 6,237,328 B1 | 5/2001 | Kerns | |
| 6,257,194 B1 | 7/2001 | Kerns et al. | |
| 6,269,793 B1 | 8/2001 | Russ et al. | |
| 6,763,298 B2 | 7/2004 | Boggs et al. | |
| 7,182,072 B1 | 2/2007 | Clemens | |
| 7,930,087 B2 | 4/2011 | Gibson et al. | |
| 8,099,947 B2 | 1/2012 | Makki et al. | |
| 8,375,701 B2 | 2/2013 | Lupescu et al. | |
| 8,438,837 B2 | 5/2013 | Hermansson et al. | |
| 8,447,494 B2 | 5/2013 | Wang et al. | |
| 8,775,011 B2 | 7/2014 | Makki et al. | |
| 8,800,356 B2 | 8/2014 | Makki et al. | |
| 9,243,592 B2 | 1/2016 | Dudar et al. | |
| 9,708,990 B2 * | 7/2017 | Dudar | F02M 25/0854 |
| 9,850,832 B2 | 12/2017 | Dudar | |
| 10,012,183 B2 | 7/2018 | Dudar | |
| 10,550,776 B1 * | 2/2020 | Leone | F02D 41/004 |
| 2006/0184311 A1 * | 8/2006 | Schulte | F02D 41/1498 |
| | | | 701/114 |
| 2013/0164644 A1 | 6/2013 | Noh et al. | |
| 2014/0067235 A1 | 3/2014 | Banker et al. | |
| 2014/0352658 A1 * | 12/2014 | Jackson | F02D 41/0037 |
| | | | 123/344 |
| 2014/0366508 A1 | 12/2014 | Ulrey et al. | |
| 2018/0171901 A1 * | 6/2018 | Omichi | F02M 25/0872 |
| 2019/0003413 A1 * | 1/2019 | Braun | F02D 41/34 |
| 2020/0300185 A1 * | 9/2020 | Braun | F02D 41/009 |

OTHER PUBLICATIONS

Dudar, A., "Systems and Methods for Onboard Canister Purge Valve Flow Mapping," U.S. Appl. No. 15/987,046, filed May 23, 2018, 130 pages.

Leone, T. et al., "Systems and Methods for Reducing Vehicle Valve Degradation," U.S. Appl. No. 16/188,838, filed Nov. 13, 2018, 119 pages.

Dudar, A. et al., "Systems and Methods for Reducing Vehicle Valve Degradation," U.S. Appl. No. 16/188,980, filed Nov. 13, 2018, 115 pages.

Dudar, A. et al., "Systems and Methods for Reducing Vehicle Valve Degradation," U.S. Appl. No. 16/189,186, filed Nov. 13, 2018, 118 pages.

* cited by examiner

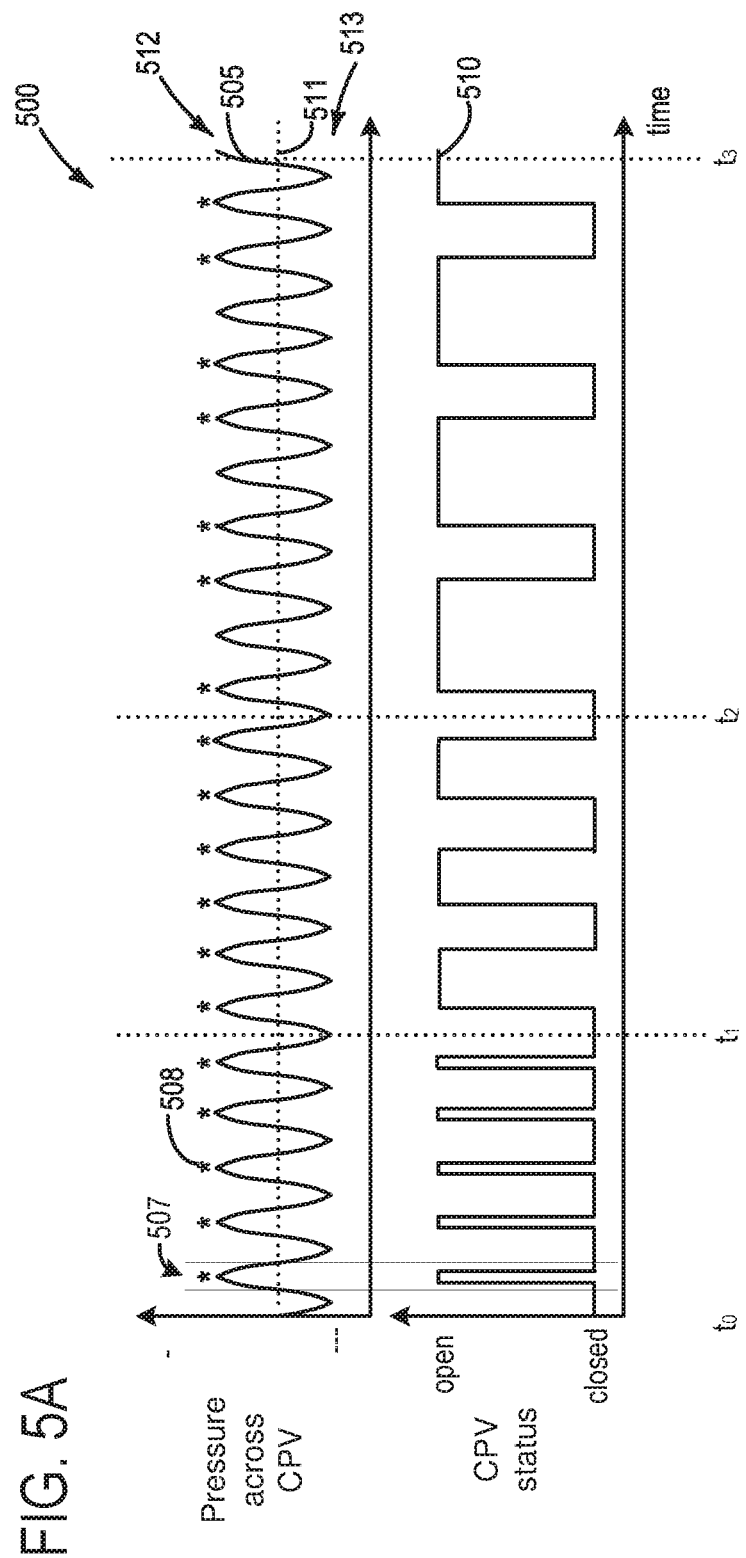

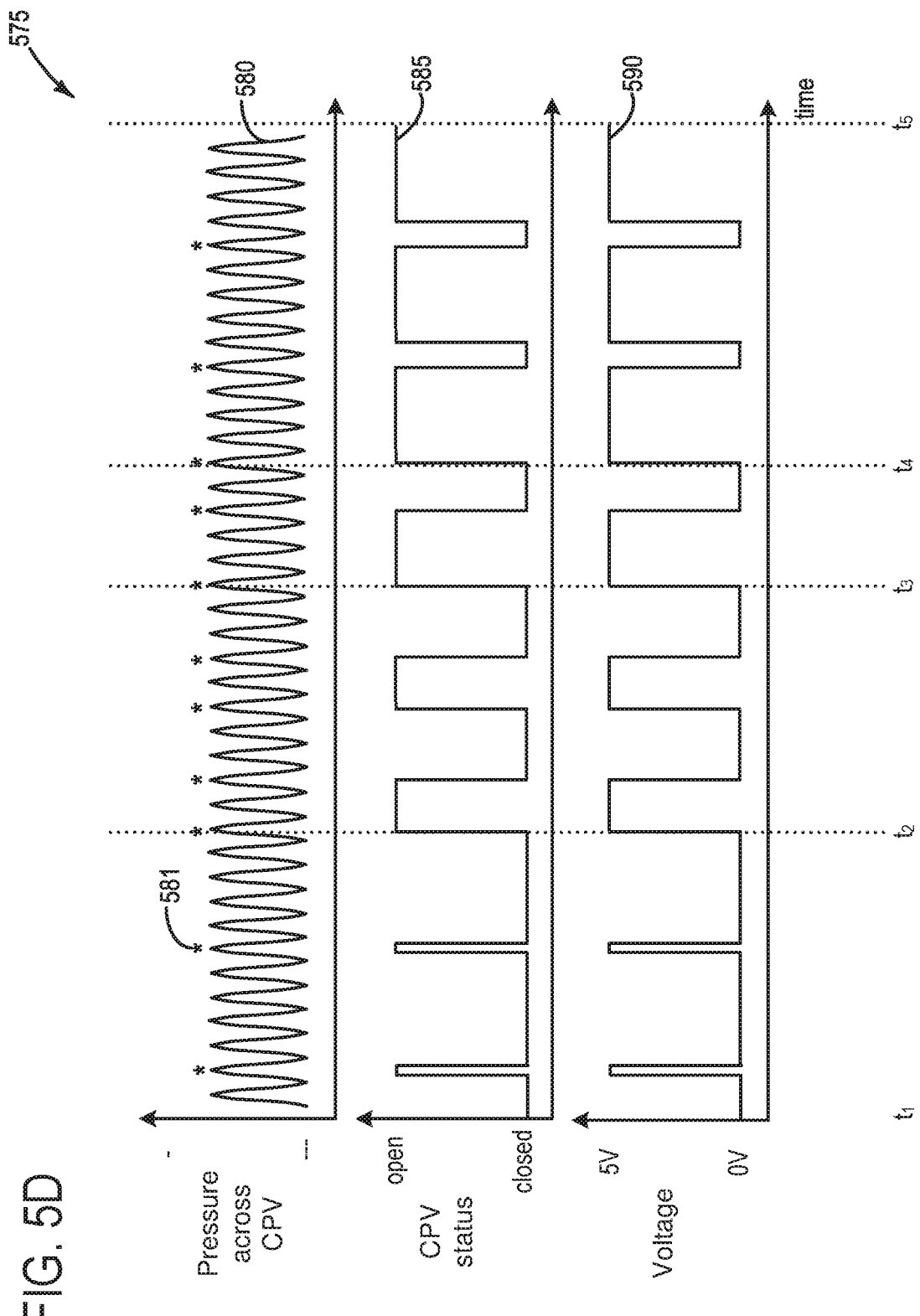

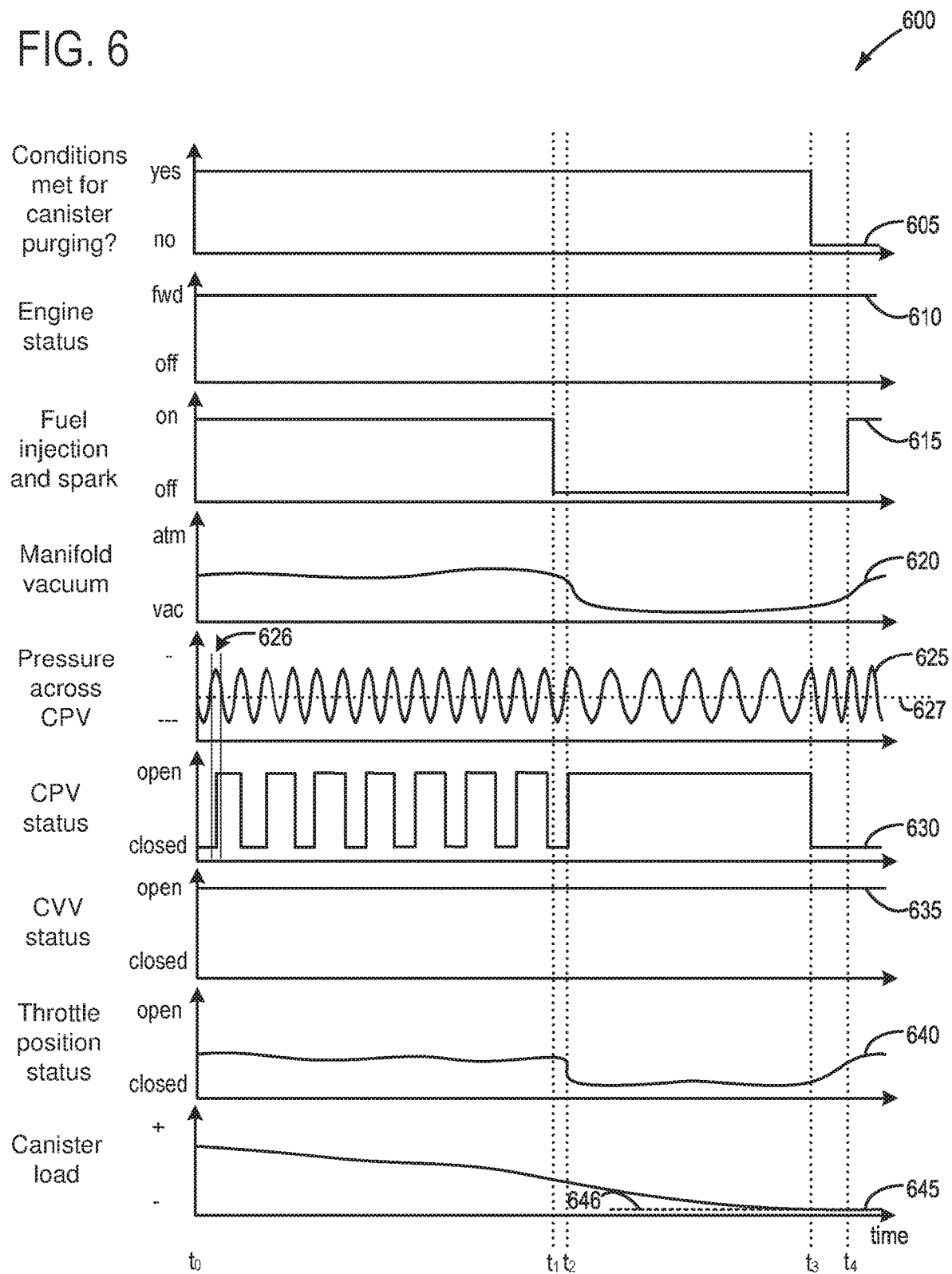

SYSTEMS AND METHODS FOR REDUCING VEHICLE VALVE DEGRADATION

FIELD

The present description relates generally to methods and systems for controlling one or more valves configured to regulate a flow of fuel vapors in a vehicle fuel system and/or evaporative emissions system, the controlling a function of engine operating conditions.

BACKGROUND/SUMMARY

Some automotive fuels may exhibit rapid evaporation in response to diurnal variations in ambient temperature. Emissions resulting from such vapors may be reduced in automotive applications via evaporative emission control systems (EVAP), The EVAP systems include a fuel vapor storage canister containing adsorbent, such as carbon, that traps those fuel vapors and feeds them back to the vehicle's engine for combustion during canister purging operations, thus, reducing evaporative emissions from the vehicle and improving fuel economy.

In a canister purge operation, a canister purge valve (CPV) coupled between the engine intake and the fuel canister may be duty cycled, allowing for intake manifold vacuum to be applied to the fuel canister. On a boosted engine, that vacuum draw may be supplied via an ejector during boosted operation. Simultaneously, a canister vent valve coupled between the fuel canister and atmosphere can be opened, allowing for fresh air to enter the canister. Further, in some examples, a fuel tank isolation valve coupled between the fuel tank and the fuel canister may be closed to reduce the flow of fuel vapors from the fuel tank to the engine. This configuration facilitates desorption of stored fuel vapors from the adsorbent material in the canister, regenerating the adsorbent material for further fuel vapor adsorption.

Canister purge valves in EVAP systems that are duty cycled may have durability issues. Furthermore, opening and closing the CPV when there is a high pressure difference across the valve may result in the CPV experiencing higher loads and stresses as compared to situations where there is a lower pressure difference across the valve. Depending on the frequency and duty cycle of the purge valve opening and closing during pulsed flow control compared to engine firing frequency, more or less openings can occur at varying pressure differences, thus leading to unequal degradation of the valve due to the higher loads and stresses.

The inventors herein have recognized the above-mentioned issues and desires, and have developed systems and methods to at least partially address them. In one example, a method comprises sequentially increasing a duty cycle of a canister purge valve over a course of a purging operation to purge fuel vapors stored in a fuel vapor canister to an intake of an engine, while timing opening and closing events of the canister purge valve to coincide with pressure differences lower than a threshold in terms of pressure oscillations across the canister purge valve during the purging operation. In this way, issues related to CPV degradation and NVH may be reduced or avoided.

In a first example of the method, the method may further comprise sequentially increasing the duty cycle of the canister purge valve over the course of the purging operation in response to a learning of an amount of fuel vapors being purged to the intake of the engine. In such a method, the engine may be combusting air and fuel during the purging operation.

In another example of the method, timing the opening and closing events of the canister purge valve may be via controlling a pulse width modulation signal to the canister purge valve as a function of the pressure oscillations across the canister purge valve.

In such a method, sequentially increasing the duty cycle of the canister purge valve may include adjusting a frequency at which the canister purge valve is opened and closed in order to time the opening and closing events of the canister purge valve to coincide with the pressure differences lower than the threshold in terms of the pressure oscillations across the canister purge valve during the purging operation.

In such a method, the method may further comprise maintaining a desired engine air-fuel ratio during the sequentially increasing the duty cycle of a canister purge valve over the course of the purging operation.

In such a method, the method may further comprise adjusting the timing of the opening and the closing events of the canister purge valve in response to changes in one or more of a frequency, a phase and/or an amplitude of the pressure oscillations across the canister purge valve during the purging operation, to maintain timing the opening and the closing events of the canister purge valve to coincide with the pressure differences lower than the threshold in terms of the pressure oscillations across the canister purge valve during the purging operation. In such an example, the method may further comprise continually updating the frequency, the phase, and the amplitude of the pressure oscillations during the purging operation in order to time the opening and closing events of the canister purge valve to coincide with the pressure differences lower than the threshold in terms of the pressure oscillations across the canister purge valve during the purging operation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5A depicts an example timeline for ramping up a duty cycle of a canister purge valve during a canister purging event, where a pulse width modulation (PWM) signal to the CPV is controlled as a function of pressure oscillations across the CPV.

FIG. 5D depicts an example timeline illustrating a timing of voltage pulses applied to the CPV as in FIGS. 5B-5C, where a frequency of valve pulsing is lower than a frequency of pressure oscillations across the CPV, and where CPV duty cycle changes without a corresponding change in frequency of the valve pulsing.

FIG. 6 depicts an example timeline for conducting canister purging according to the methodology depicted at FIGS. 3-4.

DETAILED DESCRIPTION

The following description relates to systems and methods for reducing degradation of one or more valves that control flow of fuel vapors in a vehicle fuel system and/or evaporative emissions system. In one example the valve is a canister purge valve (CPV) positioned in a purge line coupling a fuel vapor canister to engine intake. In another example the valve is a fuel tank pressure control valve (TPCV) that is used for depressurizing the fuel tank under particular vehicle operating conditions. The systems and methods discussed herein are particularly applicable to hybrid electric vehicles, such as the hybrid vehicle system of FIG. 1. Specifically, a fuel vapor canister traps and stores fuel vapors from a vehicle fuel system, and at a later time, the contents of the canister are purged to the engine where the stored fuel vapors are combusted. To purge the canister, the CPV can be pulse width modulated (PWM) to open and close at a particular frequency. However, pressure differences across the CPV may affect the forces and stresses for each opening and closing event of the CPV. As one side of the CPV is connected to engine intake, pressure oscillations during canister purging events stemming from engine operation (e.g. intake and exhaust valve opening/closing, phasing/timing changes when variable camshaft timing is used to alter intake and/or exhaust valve timing, etc.) may result in situations where the CPV is commanded open at times when pressure across the CPV is greater as compared to lower in terms of the pressure oscillations. This may disproportionately adversely impact CPV function (e.g. lead to degradation) as compared to CPV opening/closing events when pressure across the CPV is lower in terms of the pressure oscillations. Furthermore, when the CPV is opened/closed when pressure differences across the CPV are greater (as compared to lower) in terms of the pressure oscillations, issues related to undesirable noise, vibration and harshness (NVH) may be increased. Similar issues may arise in duty cycling the TPCV to relieve pressure. For example, if the TPCV is controlled to open and/or close when pressure differences are high as compared to low in terms of pressure oscillations across the TPCV during fuel tank depressurization routines, then TPCV degradation may occur at a faster rate than if the TPCV is controlled to open and/or close when the pressure differences are low as compared to high. Thus, it is herein recognized that it may be desirable to control the PWM signal to the CPV or TPCV such that opening and closing events of are timed to coincide with lower pressure differences across the valve in terms of the pressure oscillations. Depicted at FIG. 2 is an example illustration of such pressure oscillations across a CPV during a canister purging operation, highlighting points along the pressure oscillation wave where the CPV may be opened/closed in order to reduce degradation of the CPV and to reduce NVH issues.

Figure 3:
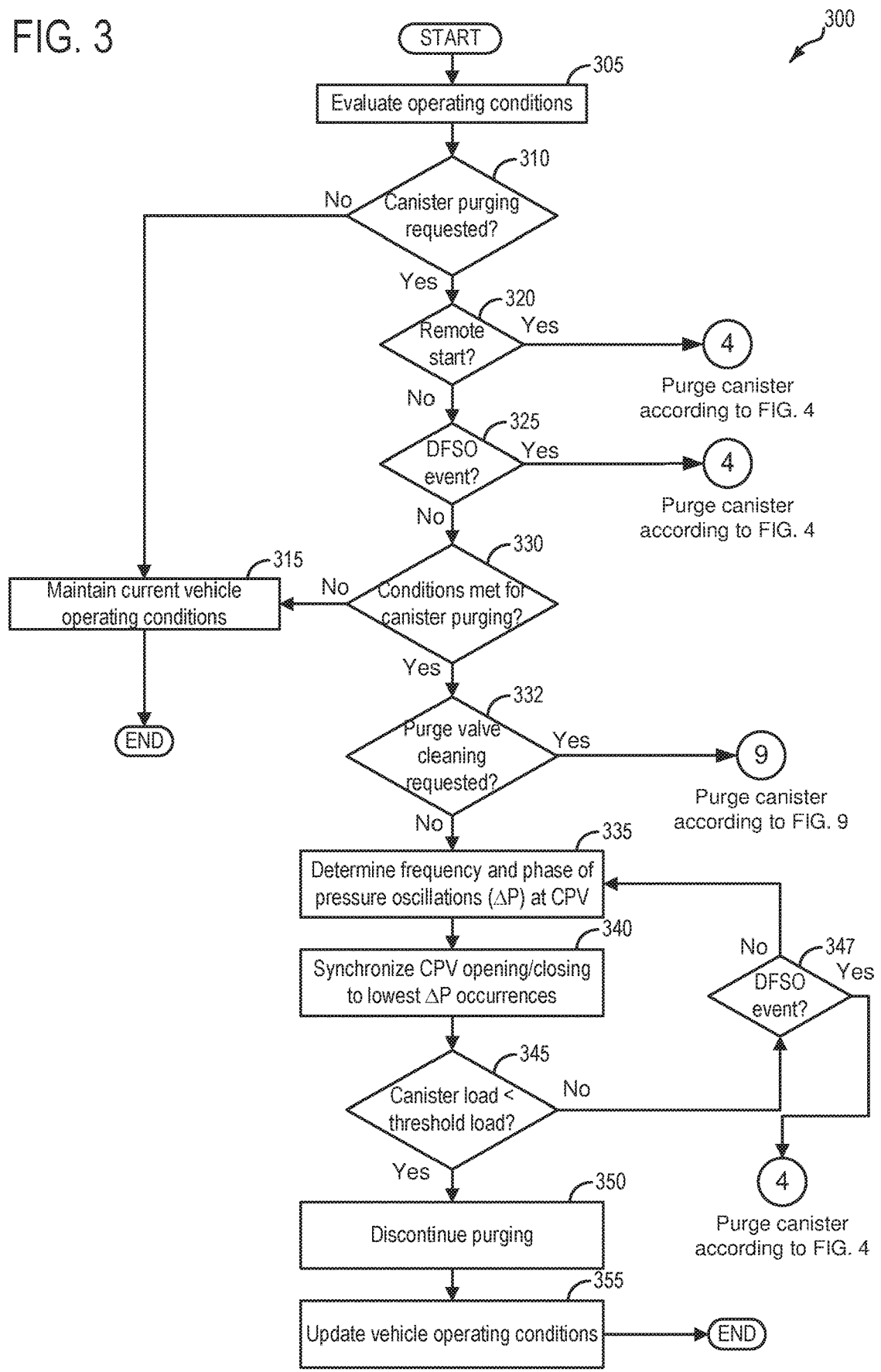
FIG. 3 depicts a high-level example method for selecting an appropriate strategy to conduct a canister purging event to reduce wear and tear on a canister purge valve.

FIG. 3 depicts an example method for selecting whether to time opening/closing of the CPV with the points of a pressure oscillation wave that comprise the lower pressure differences across the CPV in terms of the pressure oscillations as compared to greater pressure differences, or to take a different approach. Specifically, there may be some circumstances of vehicle operation where instead of timing the CPV opening/closing events as discussed, it may instead be desirable to purge the canister immediately with a 100% duty cycle, which may greatly reduce opportunities for degradation of the CPV and which additionally may aggressively purge the canister which may be desirable for hybrid vehicles with limited engine run time. Such circumstances include remote engine start events and deceleration fuel shut off (DFSO) events, and it will be discussed in further detail below as to why such conditions may be amenable to aggressively purging the canister with a 100% duty cycle. Thus, if it is determined that the vehicle is in the process of a remote start event or a DFSO mode, then the method of FIG. 4 may be used to purge the canister.

Figure 4:
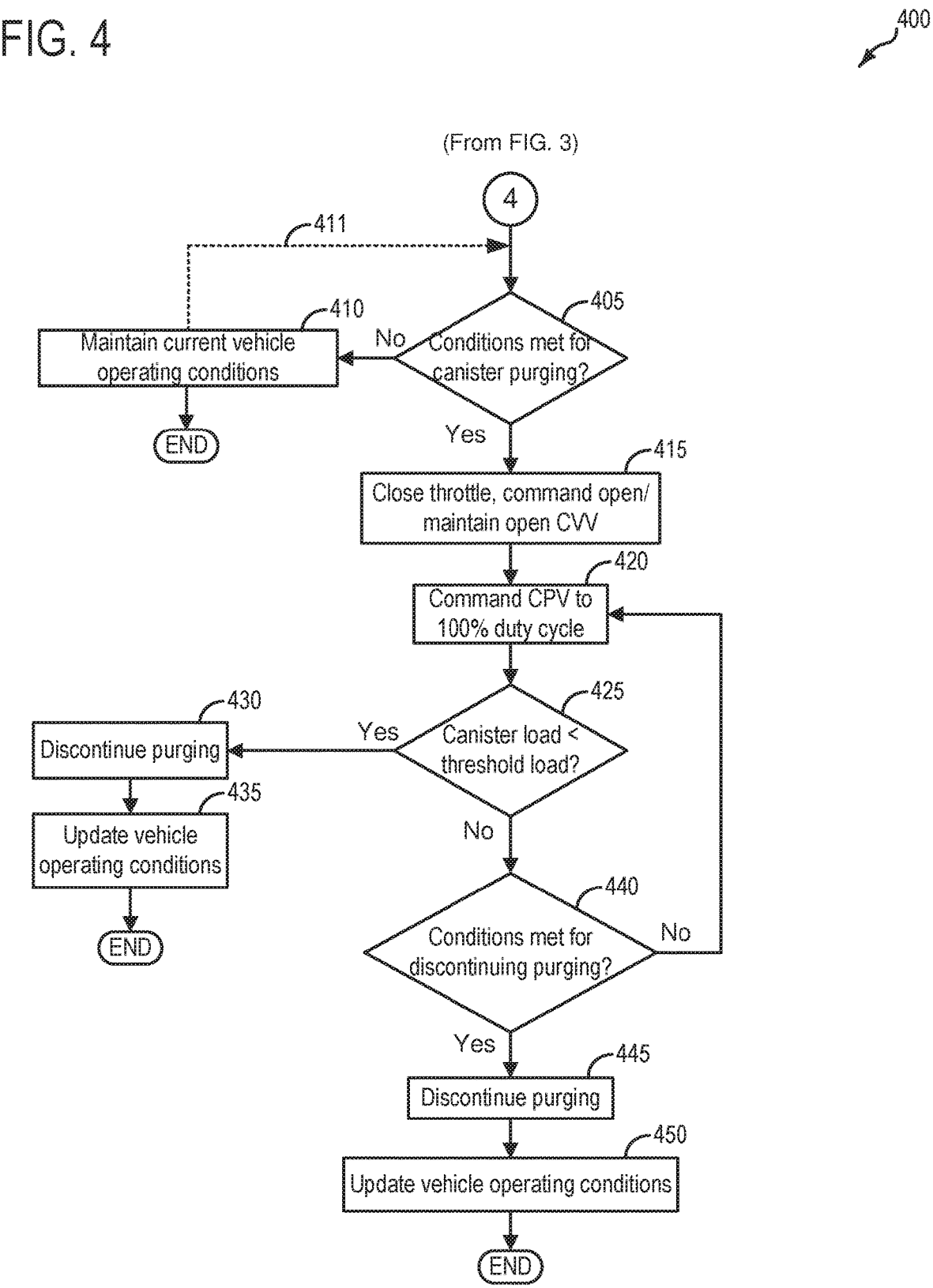
FIG. 4 depicts a high-level example method for conducting a canister purging operation under conditions of a remote engine start event and/or a deceleration fuel shut-off event.
Figure 5B:
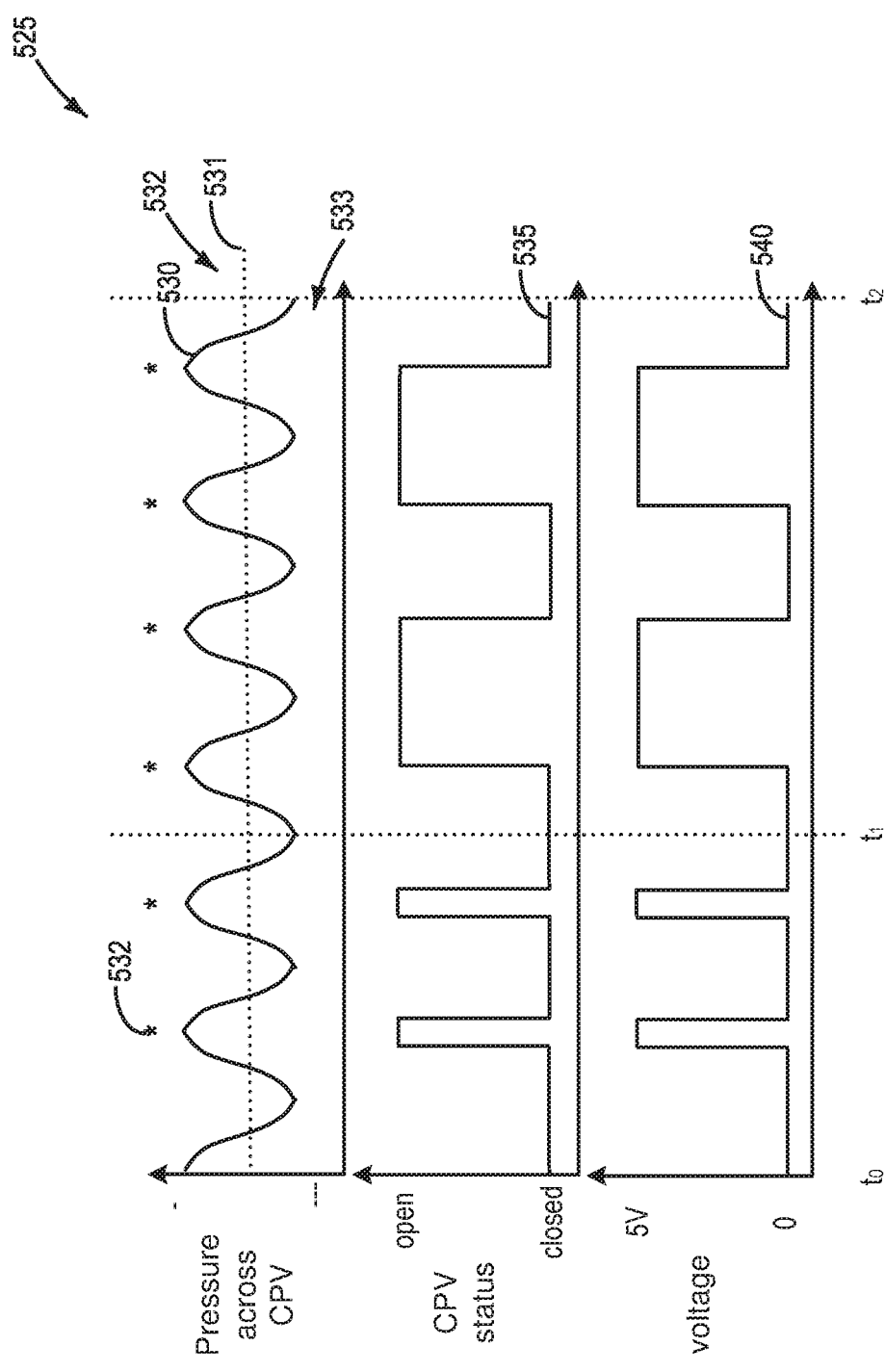
FIG. 5B depicts an example timeline illustrating a timing of voltage pulses applied to the CPV, where the CPV comprises a solenoid valve, and where a frequency of valve pulsing is equal to or less than a frequency of pressure oscillations across the CPV.
Figure 5C:
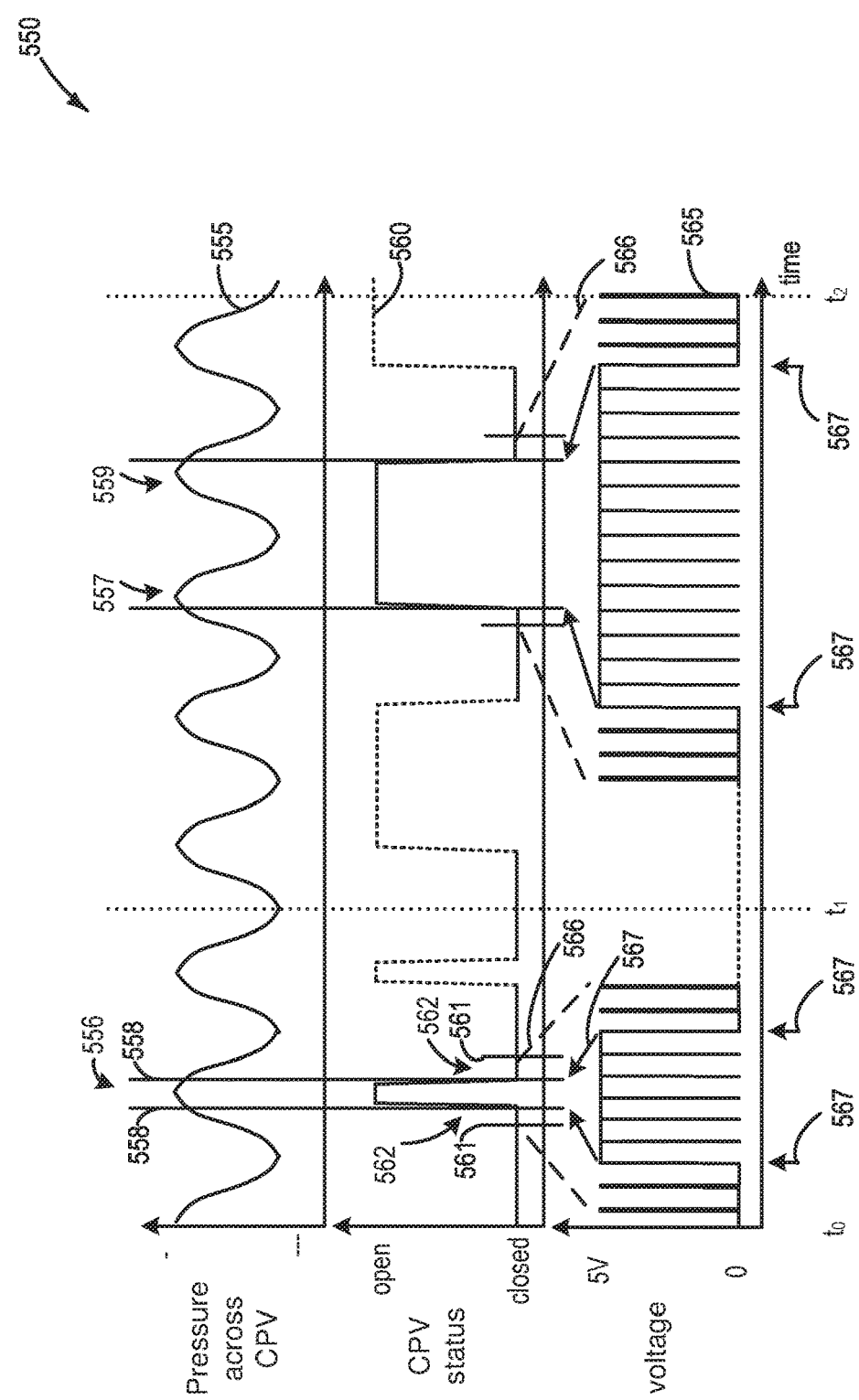
FIG. 5C depicts an example timeline illustrating a timing of voltage pulses applied to the CPV as in FIG. 5B, where a frequency of valve pulsing is greater than a frequency of pressure oscillations across the CPV.

FIG. 5A depicts an example timeline illustrating how, depending on the pressure oscillations across the CPV, a purge ramp may be conducted. In other words, FIG. 5A depicts how duty cycle and frequency of opening/closing events of the CPV may be adjusted or controlled in order to increase an amount of vapors purged to the engine intake during a purge event, while maintaining the CPV opening/closing events to coincide with low pressure events in terms of the pressure oscillations. The CPV may be a solenoid-actuated valve, and accordingly, FIG. 5B depicts how voltage pulses to the CPV may be controlled in order to time CPV opening/closing events with low pressure points in terms of the pressure oscillations across the CPV during a purging event. In some examples, the frequency of CPV pulsing may be greater than a frequency of pressure oscillations across the CPV, as depicted at FIG. 5C. Alternatively, another example includes a situation where the frequency of CPV pulsing may be less than the frequency of pressure pulsations across the CPV, as depicted at FIG. 5D. An example timeline for conducting a canister purging operation according to the methods of FIGS. 3-4, is depicted at FIG. 6.

Figure 7:
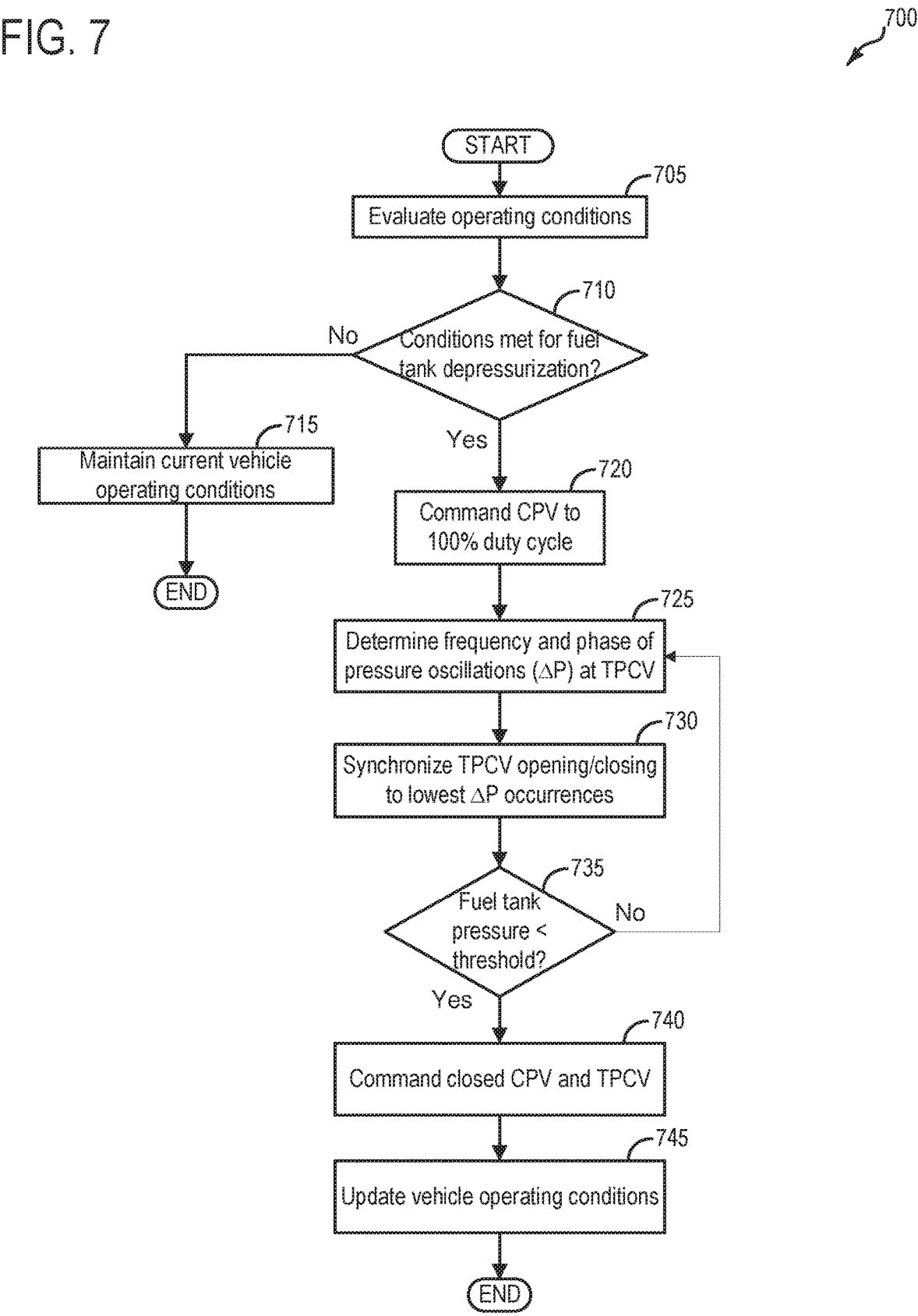
FIG. 7 depicts a high-level example method for conducting a fuel tank depressurization routine that reduces wear and tear on a fuel tank pressure control valve (TPCV).
Figure 8:
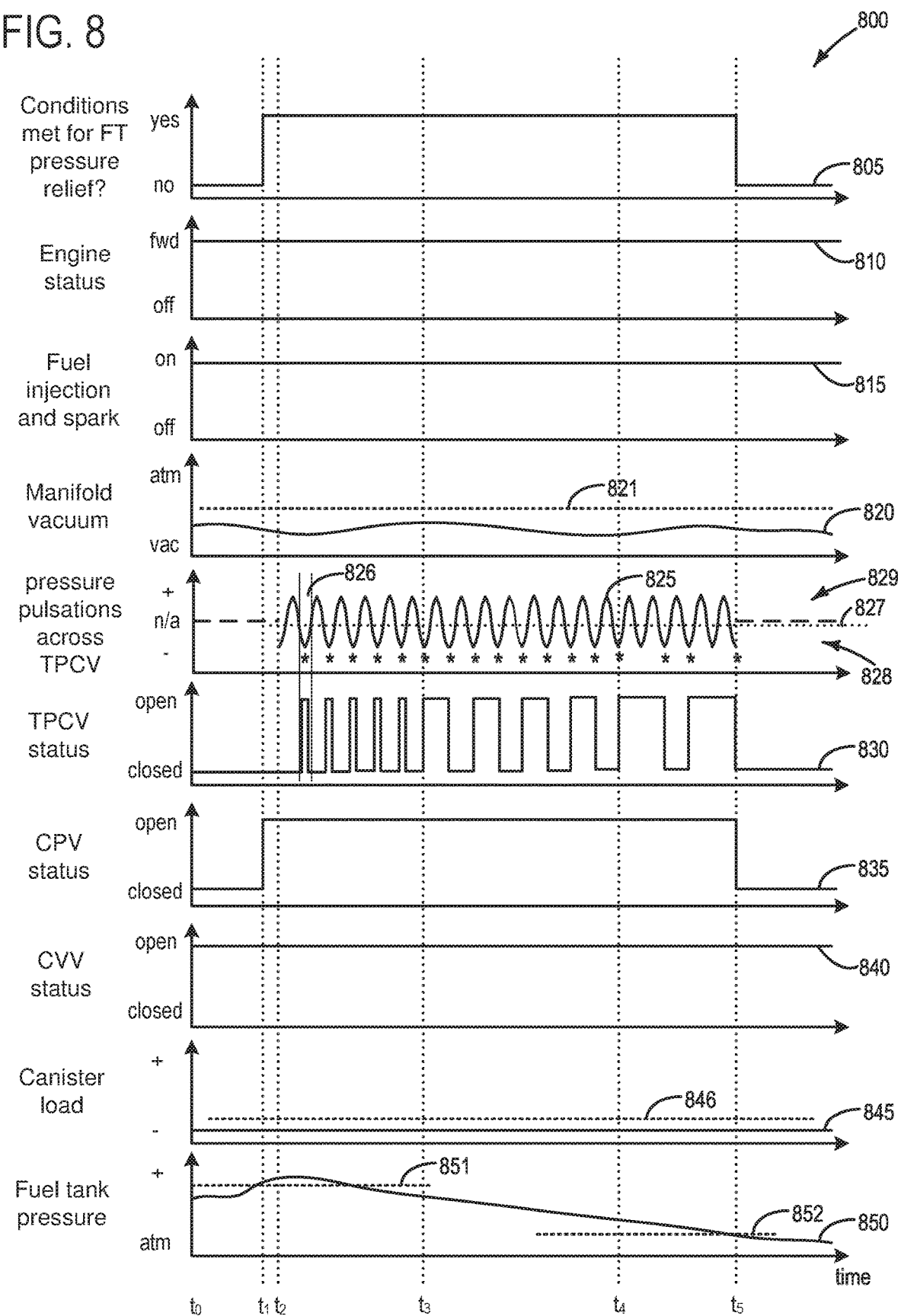
FIG. 8 depicts an example timeline for conducting the fuel tank depressurization routine according to the method depicted at FIG. 7.

As discussed above, in other examples it may be desirable to control a TPCV in similar fashion as that discussed in terms of the CPV, to reduce valve degradation during fuel tank depressurization events. A method for doing so is depicted at FIG. 7. FIG. 8 depicts an example timeline for conducting a fuel tank depressurization, where the TPCV is timed to open and close at times corresponding to low pressure differences across the TPCV in terms of pressure oscillations across the TPCV, according to the method of FIG. 7.

Figure 9:
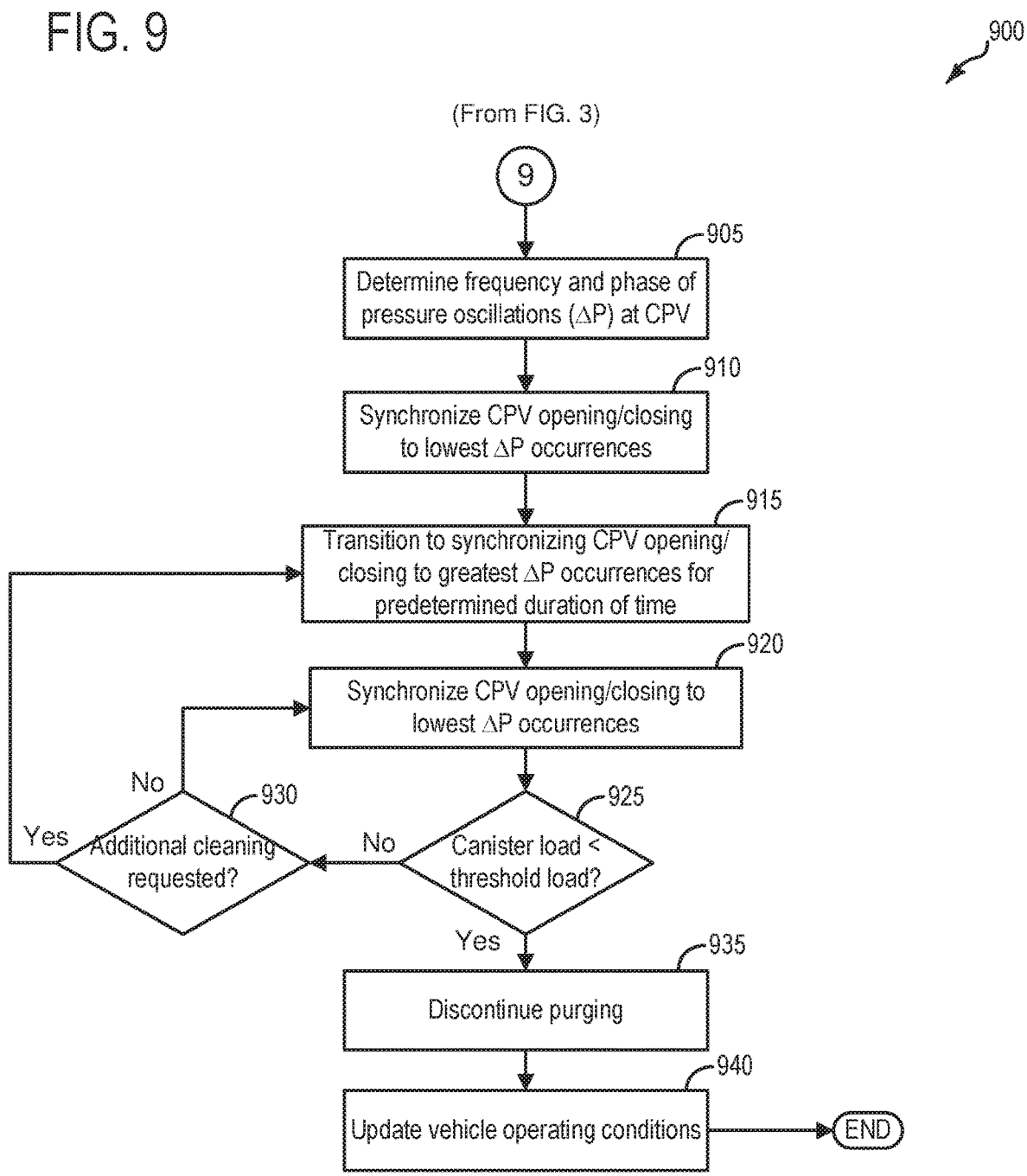
FIG. 9 depicts a high-level example method that continues from FIG. 3, and includes conducting a cleaning operation on the CPV during purging of the canister.
Figure 10:
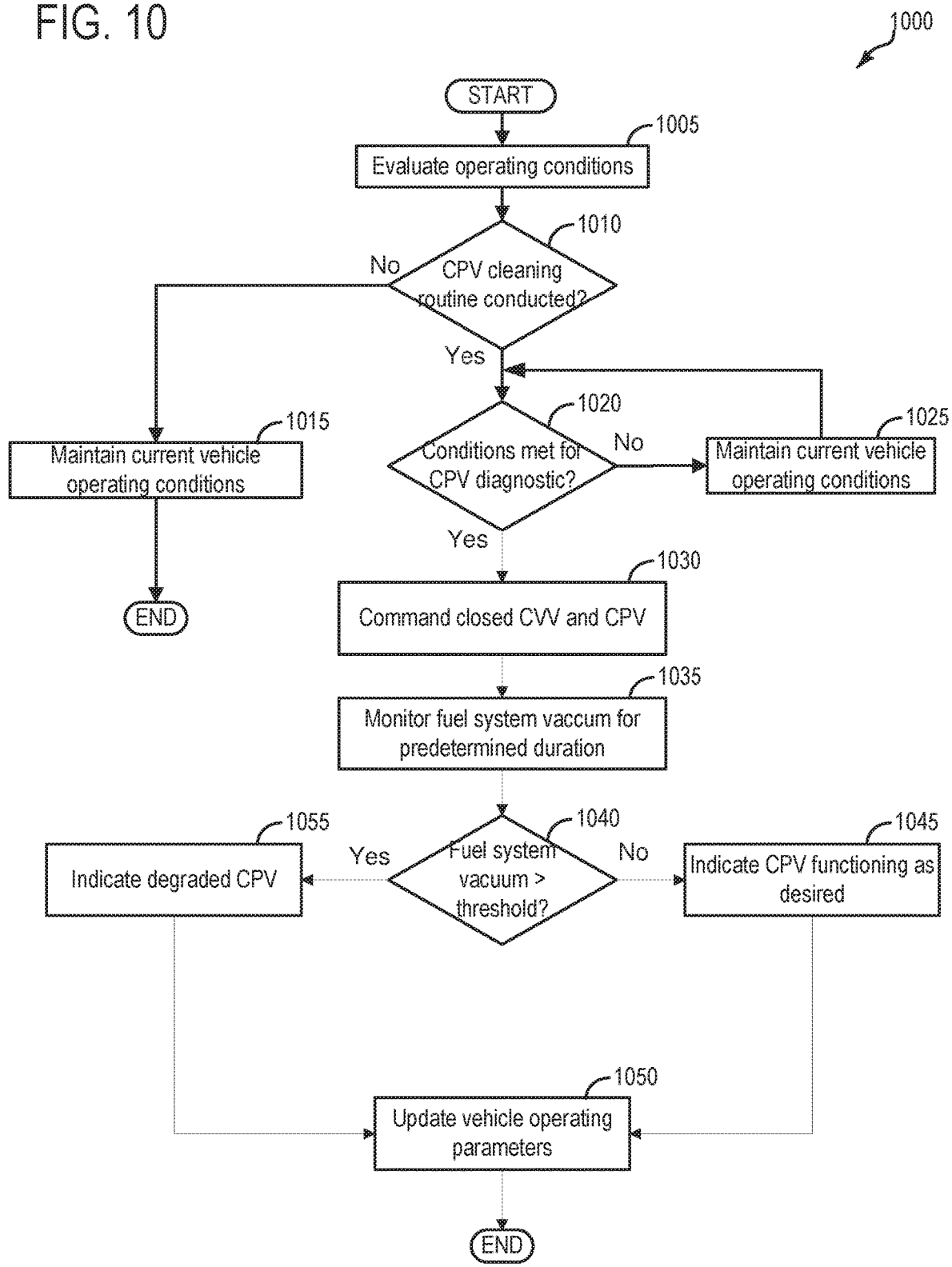
FIG. 10 depicts a high-level example method for determining whether the cleaning routine depicted at FIG. 9 was successful.
Figure 11:
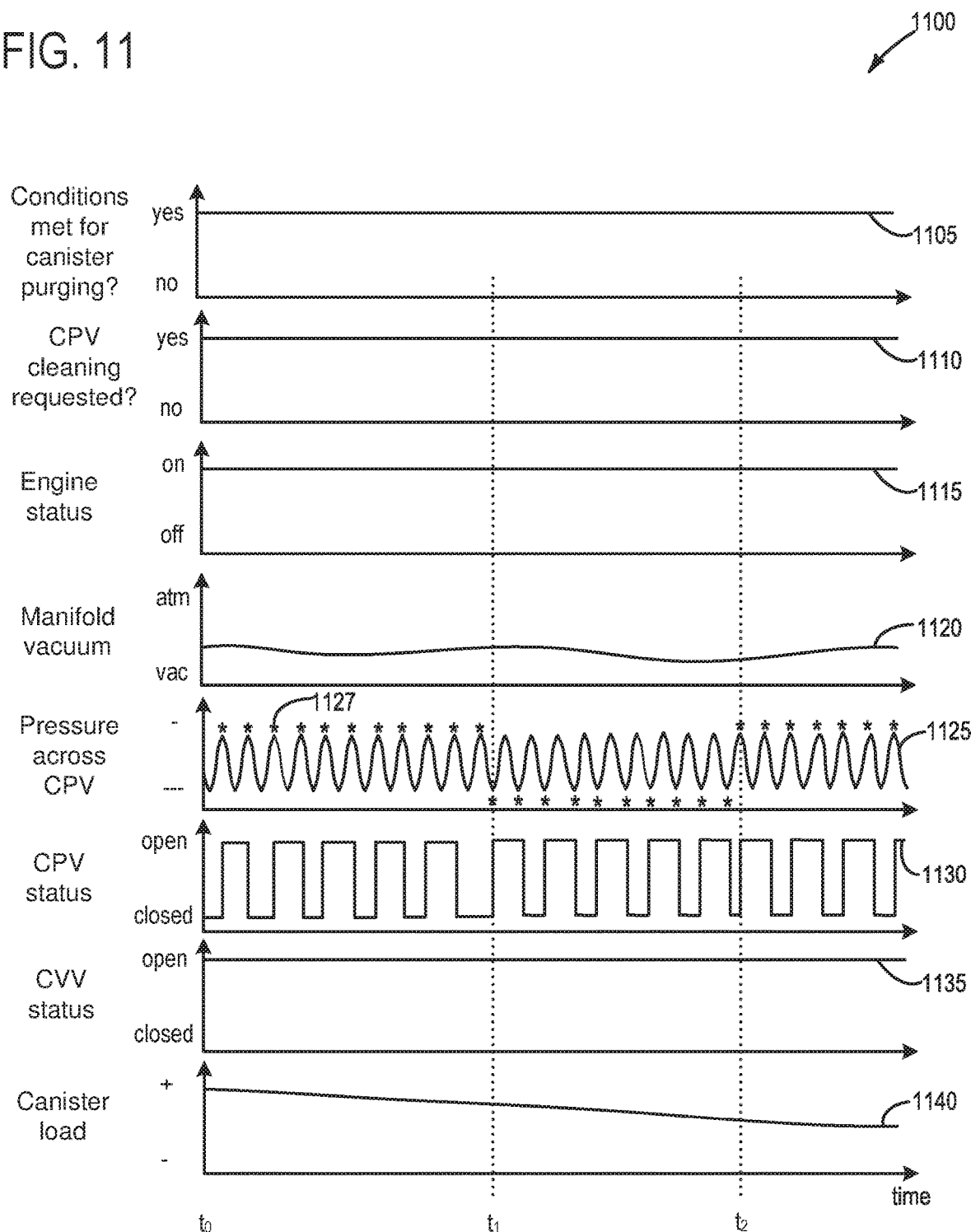
FIG. 11 depicts an example timeline for conducting the CPV cleaning operation according to the method of FIG. 9.
Figure 12:
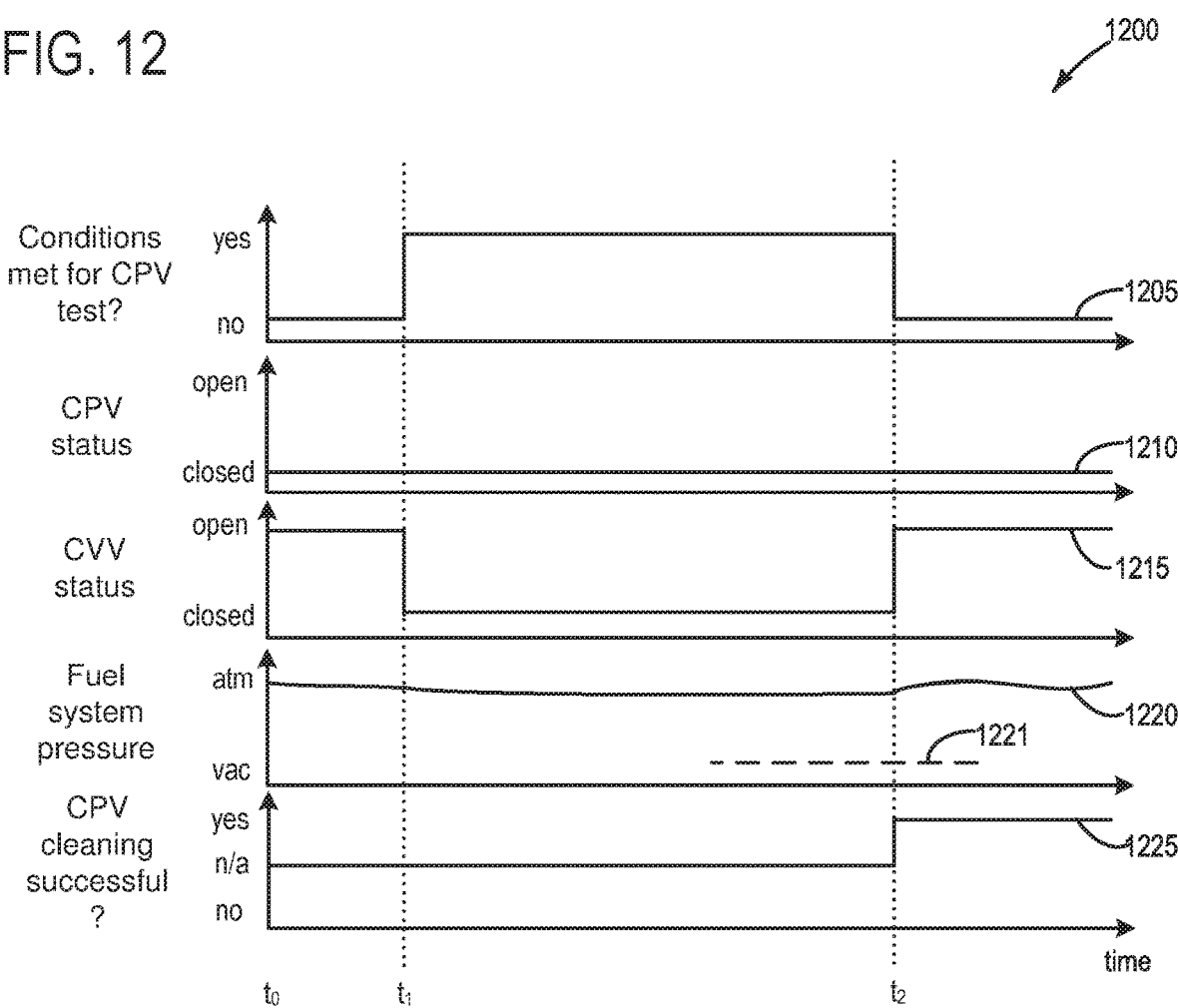
FIG. 12 depicts an example timeline for verifying whether the CPV cleaning routine was successful, according to the method of FIG. 10.

While controlling CPV opening and closing events to coincide with low pressure differences across the CPV during purging of the canister may reduce degradation, there may be circumstances where the CPV is determined to be not sealing properly when closed. In such a case, it may be desirable to time CPV opening and closing events to coincide with high pressure differences across the CPV in terms of pressure oscillations during purging the canister. In this way, whatever is causing the CPV to not seal properly when closed (e.g. carbon pellets, dust, fibers, cardboard, etc.), may be dislodged, resulting in the CPV once again sealing properly. Accordingly, a method for conducting a CPV cleaning operation is depicted at FIG. 9. After conducting the CPV cleaning operation, the method of FIG. 10 may be used to ascertain whether the CPV cleaning routine successfully restored the ability of the CPV to seal properly or as expected, when commanded closed. A timeline for conducting the CPV cleaning operation according to the method of FIG. 9, is depicted at FIG. 11. A timeline for ascertaining whether such a CPV cleaning operation resulted in the ability of the CPV to seal properly according to the method of FIG. 10, is depicted at FIG. 12.

Figure 1:
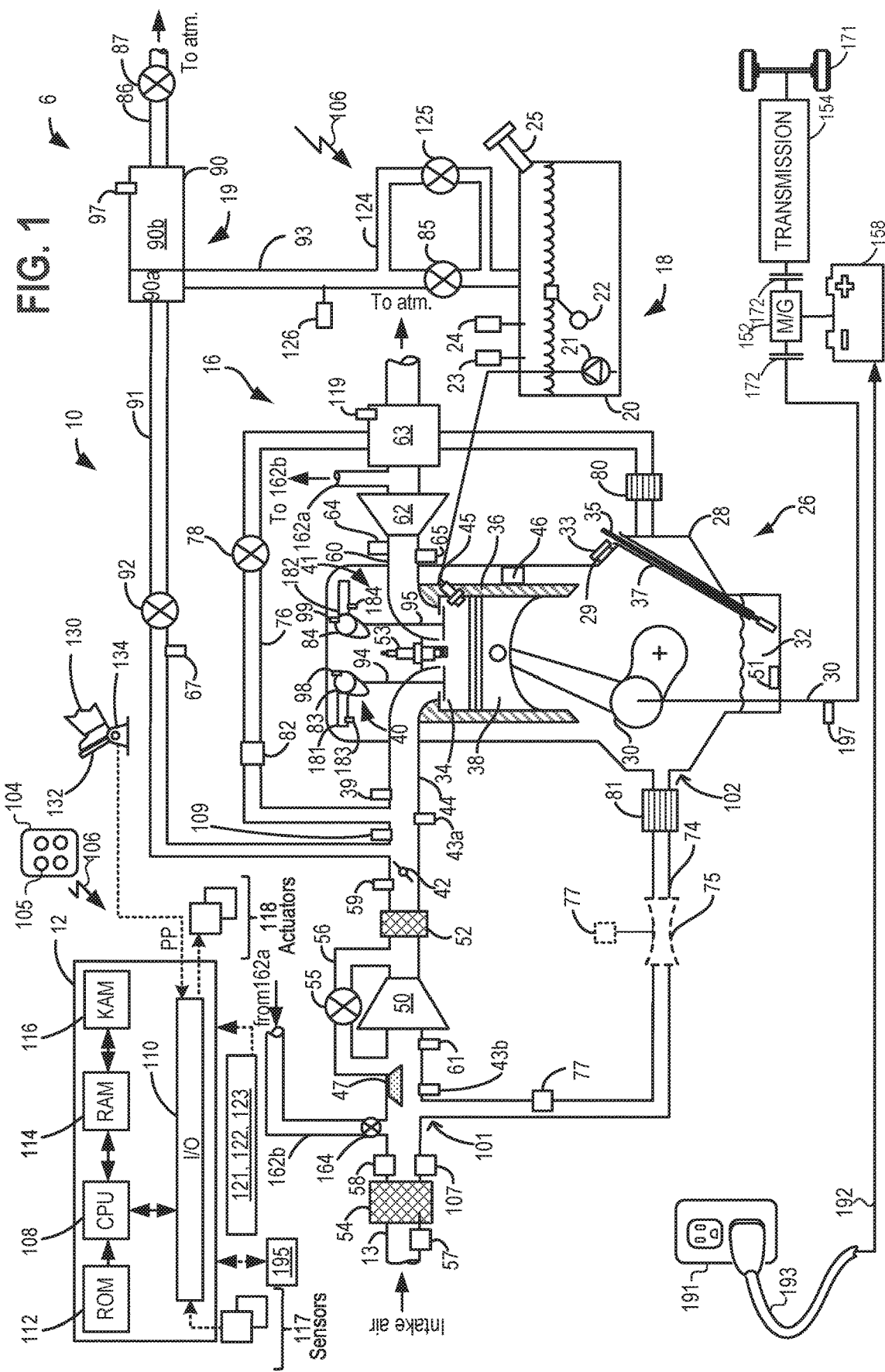
FIG. 1 shows a schematic description of an engine including a fuel system, and an evaporative emissions system.
Figure 2:
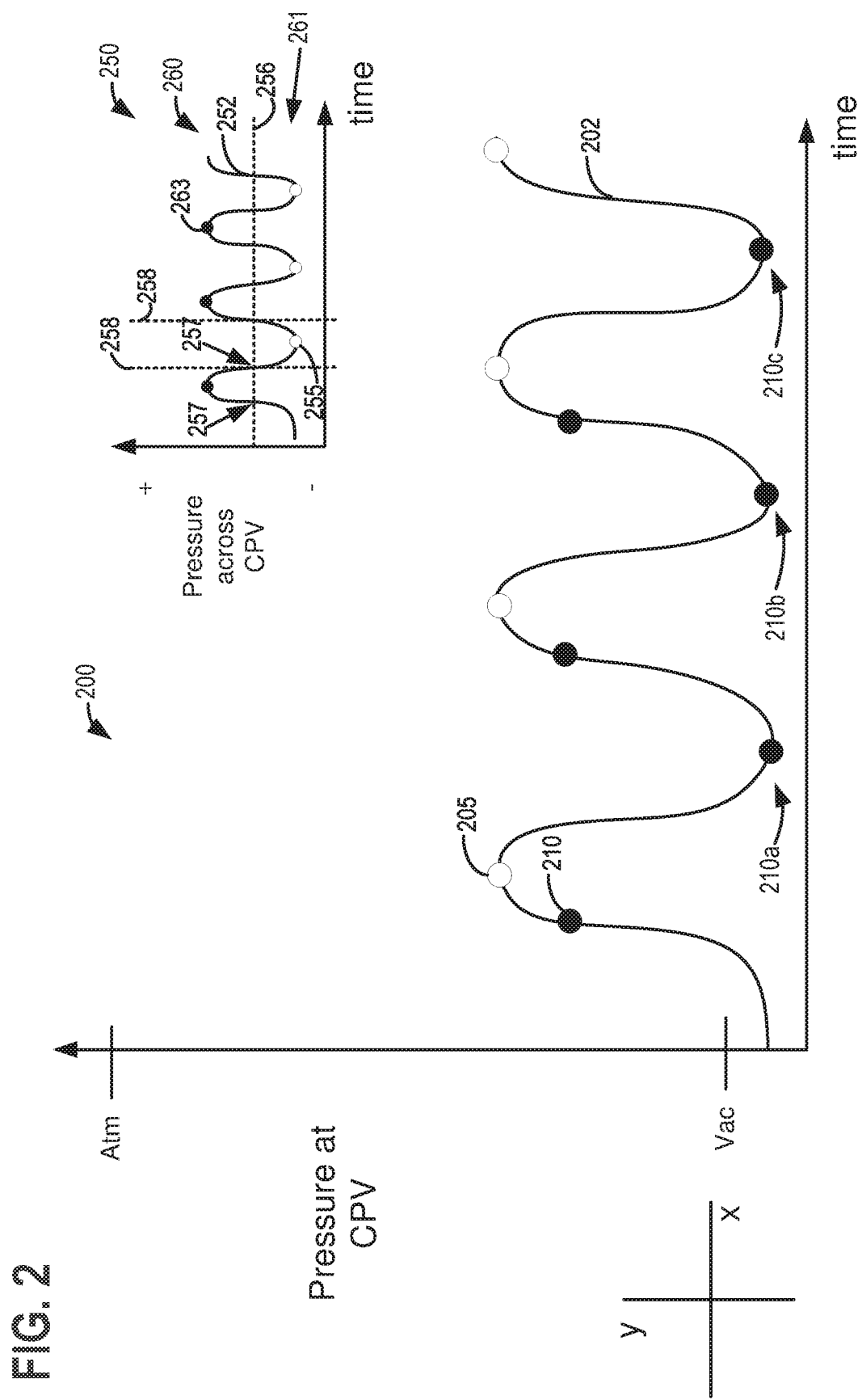
FIG. 2 graphically illustrates pressure oscillations across a canister purge valve as a function of engine operating conditions.

Turning now to FIG. 1, a schematic depiction of a hybrid vehicle system 6 is presented that can derive propulsion power from engine system 10 and/or an on-board energy storage device, such as a battery system (see below). An energy conversion device, such as a generator (see below), may be operated to absorb energy from vehicle motion and/or engine operation, and then convert the absorbed energy to an energy form suitable for storage by the energy storage device. Engine system 10 may comprise a multi-cylinder internal combustion engine, which may be included in a propulsion system of an automotive vehicle. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil fill port 29 when the engine is in operation. A dip stick tube 37 may also be disposed in crankcase 28 and may include a dipstick 35 for measuring a level of oil in oil well 32. An oil temperature sensor 51 may be included in crankcase 28, and may monitor temperature of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 44 which is positioned downstream of throttle 42. The engine block 26 may also include an engine coolant temperature (ECT) sensor 46 input into an engine controller 12.

In some embodiments, each cylinder of engine 10 may include a spark plug 53 for initiating combustion. An ignition system (not shown) may provide an ignition spark to cylinder 34 via spark plug 53 in response to a spark advance signal from a controller, under select operating modes.

Throttle 42 may be disposed in the engine intake to control the airflow entering intake manifold 44 and may be preceded upstream by compressor 50 followed by charge air cooler 52, for example. Throttle 42 may comprise an electrically actuated throttle, for example. An air filter 54 may be positioned upstream of compressor 50 and may filter fresh air entering intake passage 13. The intake air may enter combustion chamber 34 via intake valve system 40. Likewise, combusted exhaust gas may exit combustion chamber 34 via exhaust valve system 41. In one example, one or more of the intake valve system and the exhaust valve system may be cam-actuated. In another example, one or more of the intake valve system and the exhaust valve system may be electrically-actuated. Intake air may bypass compressor 50 via compressor bypass conduit 56, during conditions wherein compressor bypass valve (CBV) 55 is opened. In this way, pressure buildup at the compressor inlet may be relieved.

Each cylinder of engine 10 may include one or more intake valves and one or more exhaust valves. For example, cylinder 34 is shown including at least one intake valve 94 and at least one exhaust valve 95 located at an upper region of cylinder 34.

Intake valve 94 may be controlled by a controller via actuator 83. Similarly, exhaust valve 95 may be controlled by a controller via actuator 84. During some conditions, the controller may vary the signals provided to actuators 83 and 84 to control the opening and closing of the respective intake and exhaust valves. The position of intake valve 94 and exhaust valve 95 may be determined by respective position sensors 98 and 99, respectively. The valve actuators may be of the electric valve actuation type or cam actuation type, or a combination thereof. The intake and exhaust valve timing may be controlled concurrently or any of a possibility of variable intake cam timing, variable exhaust cam timing, twin independent variable cam timing (TiVCT), or fixed cam timing may be used. Each cam actuation system may include one or more cams (e.g. actuator 83 and/or 84) and may utilize one or more of cam profile switching (CPS), variable cam timing (VCT), variable valve timing (VVT) and/or variable valve lift (VVL) systems that may be operated by a controller to vary valve operation. For example, cylinder 34 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Shown for illustrative purposes at FIG. 1 is an example of TiVCT. Specifically, an intake camshaft 181 and an exhaust camshaft 182 are illustrated. It may be understood that such a configuration may enable the ability to advance or retard timing of both the intake camshaft 181 and the exhaust camshaft 182 independently. Such an ability may allow for improved power and torque, particularly at lower engine speed (engine RPM), as well as improved fuel economy and reduced emissions. Such an ability may further enable precise control over intake and exhaust valve position, which may include in some examples positioning a particular cylinder with intake and exhaust valves both at least partially open.

In an example, a first oil pressure-controlled actuator 183 under control of the controller may regulate rotation of intake camshaft 181, and a second oil pressure-controlled actuator 184 may regulate rotation of second camshaft 182. In this way the first and second oil pressure-controlled actuators may control the camshafts to advance or retard engine timing based on operating conditions. For example, the controller may utilize crankshaft position sensor 197 and position sensor(s) 98 and 99 to determine engine timing.

While the example depicted herein at FIG. 1 illustrates the actuators (e.g. 183 and 184) of the camshafts as oil pressure-controlled, there may be some examples where instead of oil pressure driven cam phasing, cam torque actuation (CTA) may be employed, which may utilize existing torsional energy in the valve train to rotate the camshaft(s), as is commonly understood in the art.

Furthermore, it may be understood that in examples where the vehicle includes TiVCT, an EGR valve (e.g. 164) and EGR passage (e.g. 162a, 162b) may not be included in the vehicle system, as retarding exhaust cam timing may achieve a similar result as recirculating exhaust gases.

In some examples, a first intake air oxygen sensor 43a (first IAO2 sensor) may be positioned downstream of throttle 42. Furthermore, in some examples, an air intake system hydrocarbon (AIS HC) trap 47 may be positioned downstream of air filter 54, but upstream of compressor 50. Still further, in some examples, a second intake air oxygen sensor 43b (second IAO2 sensor) may be positioned upstream of the throttle 42. Second intake air oxygen sensor 43b may constitute an intake air oxygen sensor utilize for exhaust gas recirculation (EGR) purposes, for example, and may be used in vehicles in which fuel is injected directly, for example gasoline turbo direct injection (GTDI) engines.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it. Exhaust gas sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12. Engine exhaust 60 may further include one or more emission control devices 63 mounted in a close-coupled position. The one or more emission control devices may include a three-way catalyst, lean NOx trap, diesel particulate filter, oxidation catalyst, etc. In some examples, multiple exhaust gas sensors may be positioned both upstream and downstream of emission control device 63. In some examples, an electric heater 119 may be coupled to the emission control device(s), and may be under control of the controller. Such an electric heater may be utilized in some examples to raise temperature of the emission control device to a light-off temperature, or otherwise referred to as operating temperature.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or crankcase ventilation tube 74. A first side 101 of crankcase ventilation tube 74 may be mechanically coupled, or connected, to fresh air intake passage 13 upstream of compressor 50. In some examples, the first side 101 of crankcase ventilation tube 74 may be coupled to intake passage 13 downstream of air filter 54 (as shown). In other examples, the crankcase ventilation tube may be coupled to intake passage 13 upstream of air filter 54. A second, opposite side 102 of crankcase ventilation tube 74 may be mechanically coupled, or connected, to crankcase 28 via an oil separator 81.

Crankcase ventilation tube 74 further includes a sensor 77 coupled therein for providing an estimate about air flowing through crankcase ventilation tube 74 (e.g., flow rate, pressure, etc.). In some embodiments, crankcase vent tube sensor 77 may be a pressure sensor, referred to herein as a crankcase pressure sensor (CKCP sensor) 77. When configured as a pressure sensor, CKCP sensor 77 may be an absolute pressure sensor or a gauge sensor. In an alternate embodiment, sensor 77 may be a flow sensor or flow meter. In still another embodiment, sensor 77 may be configured as a venturi. In some embodiments, in addition to a pressure or flow sensor 77, the crankcase vent tube may optionally include a venturi 75 for sensing flow there-through. In still other embodiments, pressure sensor 77 may be coupled to a neck of venturi 75 to estimate a pressure drop across the venturi. One or more additional pressure and/or flow sensors may be coupled to the crankcase ventilation system at alternate locations. For example, a barometric pressure sensor (BP sensor) 57 may be coupled to intake passage 13, upstream of air filter 54, for providing an estimate of barometric pressure. In one example, where crankcase vent tube sensor 77 is configured as a gauge sensor, BP sensor 57 may be used in conjunction with gauge pressure sensor 77. In some embodiments, pressure sensor 61 may be coupled in intake passage 13 downstream of air filter 54 and upstream of compressor 50 to provide an estimate of the compressor inlet pressure (CIP). However, since crankcase vent tube pressure sensor 77 may provide an accurate estimate of a compressor inlet pressure during elevated engine air flow conditions (such as during engine run-up), the need for a dedicated CIP sensor may be reduced. Further still, a pressure sensor 59 may be coupled downstream of compressor 50 for providing an estimate of a throttle inlet pressure (TIP). Any of the above-mentioned pressure sensors may be absolute pressure sensor or gauge sensors.

PCV system 16 also vents gases out of the crankcase and into intake manifold 44 via a conduit 76 (herein also referred to as PCV line 76). In some examples, PCV line 76 may include a PCV valve 78, which may be an electronically controlled valve that is controlled by controller 12. In another example, the PCV valve 78 may comprise a passively-actuatable mechanical valve. For example, the PCV valve may actively or passively vary its flow restriction in response to the pressure drop across it (or flow rate through it). Thus, in one example PCV valve 78 may be an electronically controlled valve wherein controller 12 may command a signal to change a position of the valve from a fully open position (or a position of high flow) to a fully closed position (or a position of no flow), or vice versa, or any position there-between. In another example, the PCV valve 78 may be passively actuated.

The gases (referred to herein as blow-by gasses) in crankcase 28 may consist of un-burned fuel or un-combusted fuel, un-combusted fuel vapor, un-combusted air, and fully or partially combusted gases. Further, oil mist or vapor may also be present. As such, various oil separators may be incorporated in crankcase ventilation system 16 to reduce exiting of the oil mist from the crankcase through the PCV system. For example, PCV line 76 may include a unidirectional oil separator 80 which filters oil from vapors exiting crankcase 28 before they re-enter the intake manifold 44. Another oil separator 81 may be disposed in crankcase ventilation tube 74 to remove oil from the stream of gases exiting the crankcases during boosted operation. Additionally, PCV line 76 may also include a vacuum sensor 82 coupled to the PCV system. In other embodiments, a MAP sensor 39 or manifold vacuum (ManVac) sensor may be located in intake manifold 44.

Engine system 10 is coupled to a fuel system 18. Fuel system 18 includes a fuel tank 20 coupled to a fuel pump 21 and a fuel vapor canister 90. During a fuel tank refueling event, fuel may be pumped into the vehicle from an external source through refueling port 25. Fuel tank 20 may hold a plurality of fuel blends, including fuel with a range of alcohol concentrations, such as various gasoline-ethanol blends, including E10, E85, gasoline, etc., and combinations thereof. A fuel level sensor 22 located in fuel tank 20 may provide an indication of the fuel level ("Fuel Level Input") to controller 12. As depicted, fuel level sensor 22 may comprise a float connected to a variable resistor. Alternatively, other types of fuel level sensors may be used.

Fuel pump 21 is configured to pressurize fuel delivered to the injectors of engine 10, such as example injector 45. It will be appreciated that fuel system 18 may be a return-less fuel system, a return fuel system, or various other types of fuel system. Vapors generated in fuel tank 20 may be routed to fuel vapor storage canister 90 (also referred to herein as fuel vapor canister, or just canister), via conduit 93, before being purged to engine intake manifold 44.

Fuel vapor canister 90 may be positioned in evaporative emissions system 19. Fuel vapor canister 90 is filled with an appropriate adsorbent for temporarily trapping fuel vapors (including vaporized hydrocarbons) generated during fuel tank refueling operations. In one example, the adsorbent used is activated charcoal. When purging conditions are met, such as when the canister is saturated, vapors stored in fuel vapor canister 90 may be purged to engine intake passage 13 by opening canister purge valve (CPV) 92. While a single canister 90 is shown, it will be appreciated that evaporative emissions system 19 may include any number of canisters. In one example, CPV 92 may be a solenoid valve wherein opening or closing of the valve is performed via actuation of a canister purge valve solenoid.

In some examples, a purge line pressure sensor 67 may be positioned in purge line 91. By incorporating pressure sensor 67, the CPV may be controlled to be opened/closed when pressure across the CPV is low as compared to high during a canister purging event, as will be discussed in detail below. However, such control of the CPV may be possible in the absence of such a purge line pressure sensor 67, without departing from the scope of this disclosure.

Canister 90 may include a buffer (or buffer region) 90a and a main region 90b, each of the main region 90b and the buffer 90a comprising adsorbent. The volume of the buffer may be smaller than (e.g., a fraction of) the volume of the main region 90b. Adsorbent in the buffer may be same as, or different from, the adsorbent in the main region (e.g., both may include charcoal). The buffer may be positioned within canister 90 such that during canister loading, fuel tank vapors are first adsorbed within the buffer, and then when the buffer is saturated, further fuel tank vapors are adsorbed in the main region 90b of the canister 90. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 90 includes a vent line 86 for routing gases out of the canister 90 to the atmosphere when storing, or trapping, fuel vapors from fuel tank 20. Vent line 86 may also allow fresh air to be drawn into fuel vapor canister 90 when purging stored fuel vapors to engine intake passage 13 via purge line 91 and CPV 92. While this example shows vent 86 communicating with fresh, unheated air, various modifications may also be used. Vent 86 may include a canister vent valve (CVV) 87 to adjust a flow of air and vapors between canister 90 and the atmosphere. The canister vent valve may also be used for diagnostic routines. When included, the vent valve may be opened during fuel vapor storing operations (for example, during fuel tank refueling) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 87 may be a solenoid valve wherein opening or closing of the valve is performed via actuation of a canister vent solenoid. In particular, the canister vent valve may be a default-open valve that is closed upon actuation of the canister vent solenoid. In some examples, an air filter (not shown) may be coupled in vent 86 between canister vent valve 87 and atmosphere.

Hybrid vehicle system 6 may have reduced engine operation times due to the vehicle being powered by engine system 10 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 85 may be included in conduit 93 such that fuel tank 20 is coupled to canister 90 via the valve. During regular engine operation, isolation valve 85 may be kept closed to limit the amount of diurnal or "running loss" vapors directed to canister 90 from fuel tank 20. During refueling operations, and selected purging conditions, isolation valve 85 may be temporarily opened, e.g., for a duration, to direct fuel vapors from the fuel tank 20 to canister 90. While the depicted example shows isolation valve 85 positioned along conduit 93, in alternate embodiments, the isolation valve may be mounted on fuel tank 20. The fuel system may be considered to be sealed when isolation valve 85 is closed.

One or more pressure sensors 23 may be coupled to fuel system 18 for providing an estimate of a fuel system pressure. In one example, the fuel system pressure is a fuel tank pressure, wherein pressure sensor 23 is a fuel tank pressure sensor (fuel tank pressure transducer, or FTPT) coupled to fuel tank 20 for estimating a fuel tank pressure or vacuum level. While the depicted example shows pressure sensor 23 directly coupled to fuel tank 20, in alternate embodiments, the pressure sensor may be coupled between the fuel tank and canister 90, specifically between the fuel tank and isolation valve 85. In some examples, another pressure sensor 126 may be positioned in conduit 93 between the FTIV and canister 90.

One or more temperature sensors 24 may also be coupled to fuel system 18 for providing an estimate of a fuel system temperature. In one example, the fuel system temperature is a fuel tank temperature, wherein temperature sensor 24 is a fuel tank temperature sensor coupled to fuel tank 20 for estimating a fuel tank temperature. While the depicted example shows temperature sensor 24 directly coupled to fuel tank 20, in alternate embodiments, the temperature sensor may be coupled between the fuel tank and FTIV 85. A canister temperature sensor 97 may be coupled to canister 90 and configured to indicate temperature changes of the adsorbent material within the canister. As fuel vapor adsorption is an exothermic reaction and fuel vapor desorption is an endothermic reaction, the canister temperature may be used to indicate a quantity of fuel vapor adsorbed during a venting event, and/or the quantity of fuel vapor desorbed during a purging operation.

In some examples, a fuel tank pressure control valve 125 (TPCV) may be positioned in a conduit 124 that stems from conduit 93. TPCV 125 may in some examples be duty cycled to relieve pressure in fuel tank 20. A quantity and rate of vapors released by the TPCV may be determined by the duty cycle of an associated TPCV solenoid (not shown). Fuel vapors released from the fuel tank may be drawn into the engine for combustion, as will be elaborated in further detail below. The duty cycle of the TPCV may be determined by the vehicle's powertrain control module (PCM), such as controller 12, responsive to engine operating conditions such as engine speed-load conditions, an air-fuel ratio, etc. As mentioned above and which will be elaborated further below (see FIG. 7, for example), duty cycling the TPCV may lead to degradation over time, if mitigating action is not taken to reduce the potential for such degradation. It may be understood that, when cycling of the TCPV is conducted, the fuel tank isolation valve 85 may be maintained closed.

Fuel vapors released from canister 90, for example during a purging operation, may be directed into engine intake manifold 44 via purge line 91. The flow of vapors along purge line 91 may be regulated by CPV 92, coupled between the fuel vapor canister and the engine intake. The quantity and rate of vapors released by the CPV may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. However, as discussed above and which will be discussed in more depth below, duty cycling the CPV may lead to degradation over time, where such degradation may be exacerbated or sped up if the CPV is regularly opened when there is high pressure differences across the valve. In other words, higher pressure differences across the CPV when the CPV is commanded open/closed may result in the CPV experiencing higher loads and stresses as compared to situations where there is a lower pressure difference across the valve. Accordingly, discussed herein at the methods depicted at FIGS. 3-4 are control strategies for reducing a frequency at which the CPV is opened when pressure across the CPV is greatest in terms of pressure oscillations across the CPV during canister purging events.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 85 and CVV 87 while closing CPV 92 to direct refueling vapors into canister 90 while preventing fuel vapors from being directed into the intake manifold.

As another example, the fuel system may be operated in a refueling mode (e.g., when fuel tank refueling is requested by a vehicle operator), wherein the controller 12 may open isolation valve 85 and CVV 87, while maintaining CPV 92 closed, to depressurize the fuel tank before allowing fuel to be added therein. As such, isolation valve 85 may be kept open during the refueling operation to allow refueling vapors to be stored in the canister. After refueling is completed, the isolation valve may be closed.

As discussed, the fuel system may be operated in a canister purging mode (e.g., after an emission control device light-off temperature has been attained and with the engine running), wherein the controller 12 may open canister purge valve 92 and canister vent valve while closing isolation valve 85. Herein, the vacuum generated by the intake manifold of the operating engine may be used to draw fresh air through vent 86 and through fuel vapor canister 90 to purge the stored fuel vapors into intake manifold 44. In this mode, the purged fuel vapors from the canister are combusted in the engine. The purging may be continued until the stored fuel vapor amount in the canister is below a threshold canister load (e.g. less than 5% full of vapors). During purging, a learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. Such a vapor amount/concentration may be learned via the output of the exhaust gas sensor 64, for example.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors 117 coupled to engine 10, including measurement of inducted mass air flow (MAF) from mass air flow sensor 58; engine coolant temperature (ECT) from temperature sensor 46; PCV pressure from vacuum sensor 82; exhaust gas air/fuel ratio from exhaust gas sensor 64; exhaust temperature sensor 65; crankcase vent tube pressure sensor 77, BP sensor 57, CIP sensor 61, TIP sensor 59, canister temperature sensor 97, purge line pressure sensor 67, ambient air temperature sensor 107, intake temperature sensor 109, etc. Furthermore, controller 12 may monitor and adjust the position of various actuators 118 based on input received from the various sensors. These actuators may include, for example, throttle 42, intake and exhaust valve systems 40, 41, PCV valve 78, CPV 92, FTIV 85, CVV 87, TPCV 125, etc. Storage medium read-only memory 112 can be programmed with computer readable data representing instructions executable by processor 108 for performing the methods described below, as well as other variants that are anticipated but not specifically listed.

As discussed, hybrid vehicle system 6 may include multiple sources of torque available to one or more vehicle wheels 171, however, in other examples, the vehicle may include an engine without other sources of torque available. In the example shown, hybrid vehicle system 6 includes an electric machine 152. Electric machine 152 may be a motor or a motor/generator. Crankshaft 30 of engine 10 and electric machine 152 are connected via a transmission 154 to vehicle wheels 171 when one or more clutches 172 are engaged. In the depicted example, a first clutch is provided between crankshaft 30 and electric machine 152, and a second clutch is provided between electric machine 152 and transmission 154. Controller 12 may send a signal to an actuator of each clutch 172 to engage or disengage the clutch, so as to connect or disconnect crankshaft from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 158 (also described herein as onboard energy storage device, energy storage device, or battery) to provide torque to vehicle wheels 171. Electric machine 152 may also be operated as a generator to provide electrical power to charge traction battery 158, for example during a braking operation.

Onboard energy storage device 158 may periodically receive electrical energy from a power source 191 residing external to the vehicle (e.g., not part of the vehicle) as indicated by arrow 192. As a non-limiting example, hybrid vehicle system 6 may be configured as a PHEV, whereby electrical energy may be supplied to energy storage device 158 from power source 191 via an electrical energy transmission cable 193. During a recharging operation of energy storage device 158 from power source 191, electrical transmission cable 193 may electrically couple energy storage device 158 and power source 191. While the vehicle propulsion system is operated to propel the vehicle, electrical transmission cable 193 may disconnected between power source 191 and energy storage device 158. Controller 12 may identify and/or control the amount of electrical energy stored at the energy storage device, which may be referred to as the state of charge (SOC).

In other examples, electrical transmission cable 193 may be omitted, where electrical energy may be received wirelessly at energy storage device 158 from power source 191. For example, energy storage device 158 may receive electrical energy from power source 191 via one or more of electromagnetic induction, radio waves, and electromagnetic resonance. As such, it may be appreciated that any suitable approach may be used for recharging energy storage device 158 from a power source that does not comprise part of the vehicle.

Hybrid vehicle system 6 may include an exhaust gas recirculation (EGR) system. Specifically, the EGR system may include one or more of high pressure EGR, or low pressure EGR. In the example illustration depicted at FIG. 1, a low pressure EGR system is illustrated. Specifically, an EGR passage is indicated, the EGR passage comprising passage 162a and 162b. It may be understood that passage 162a and 162b may comprise the same EGR passage, but is indicated as a broken passage for clarity. The EGR passage comprising passage 162a and 162b may further include EGR valve 164. By controlling timing of opening and closing of EGR valve 164, an amount of exhaust gas recirculation may be appropriately regulated.

In some examples controller 12 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Furthermore, controller 12 may be in communication with one or more sensors dedicated to indicating the occupancy-state of the vehicle, for example seat load cells 121, door sensing technology 122, and/or onboard cameras 123.

Thus, discussed herein, a system for a vehicle may comprise a canister purge valve positioned in a purge conduit that couples an intake of an engine to a fuel vapor canister. The system may further comprise a controller with computer readable instructions stored on non-transitory memory that when executed, cause the controller to determine a frequency, a phase, and an amplitude of pressure oscillations across the canister purge valve while duty cycling the canister purge valve to purge fuel vapors stored in the fuel vapor canister to the engine. The controller may store further instructions to set threshold pressure differences as a function of the pressure oscillations across the canister purge valve time ranges for controlling when to time opening and closing events of the canister purge valve as a function of the frequency, the phase and the amplitude of the pressure oscillations such that the opening and the closing events coincide with pressure differences across the canister purge valve lower than the threshold pressure differences. The controller may store further instructions to control the opening and the closing events of the canister purge valve based on the threshold pressure differences set as the function of the frequency, the phase and the amplitude of the pressure oscillations. The controller may store further instructions to sequentially increase the duty cycle of the canister purge valve while purging fuel vapors stored in the fuel vapor canister to the engine, while also maintaining the opening and the closing events of the canister purge valve to coincide with the pressure differences across the canister purge valve lower than the threshold pressure differences.

In such a system, the system may further comprise a pressure sensor positioned in the purge conduit. The controller may store further instructions to determine the frequency, the phase and the amplitude of the pressure oscillations across the canister purge valve based at least in part on feedback from the pressure sensor.

In such a system, the system may further comprise a manifold pressure sensor positioned in the intake of the engine, and a fuel tank pressure transducer positioned in a fuel system that is fluidically coupled to the fuel vapor canister. In such an example, the controller may store further instructions to determine the frequency, the phase and the amplitude of the pressure oscillations across the canister purge valve based on a difference between an intake manifold pressure and a fuel system pressure, corrected for an offset that is based on a buffer region of the fuel vapor canister.

In such a system, the system may further comprise an exhaust gas sensor. The controller may store further instructions to learn an amount of fuel vapor being purged from the fuel vapor canister to the engine via the exhaust gas sensor, and sequentially increase the duty cycle of the canister purge valve as a function of the learned amount of fuel vapor being purged from the fuel vapor canister to the engine.

Turning now to FIG. 2, a graphical illustration 200 depicting pressure oscillations across a CPV is shown. Time is depicted on the x axis, and pressure across the CPV is depicted on the y axis. Thus, line 202 depicts pressure across the CPV as a function of time. As depicted, there is a vacuum across the CPV, on top of which there are smaller pressure oscillations. The vacuum stems from the intake manifold (e.g. 44) of the engine (e.g. 10). In other words, in this example illustration 200, it may be understood that the engine is rotating, and the opening and closing of intake and exhaust valves (in conjunction with throttle position) generates a vacuum in the intake manifold that is communicated to the CPV.

The pressure oscillations are based on (and vary based on) several factors. One such factor is engine firing frequency, which changes with engine speed (RPM). Another such factor is phasing/timing changes of pressure oscillations when variable camshaft timing (VCT) is used. Another such factor includes how the engine and evaporative emissions system is structured, for example length of purge line coupling engine intake to the CPV, etc., and how such structure may contribute to standing pressure waves. Still another such factor includes temperature of gas in the intake and purge line, as temperature of gas affects the speed of sound and thus the propagation of pressure waves. In other words, amplitude, frequency, and phasing of pressure oscillations across the CPV change as a function of engine speed, engine load, cam timing, ambient temperature, engine and evaporative emissions system structure, etc.

As discussed above, canister purging operations are conducted by duty cycling the CPV in the purge line between engine intake and the fuel vapor storage canister with the CVV open. In this way, intake manifold vacuum may be applied to the canister, where fresh air is drawn through the canister via the open CVV. The fresh air serves to desorb stored fuel vapors from the canister, which are then routed to engine intake. If the duty cycle of the CPV is pulse width modulated (PWM) at a constant frequency (e.g. 20 Hz) and the pressure oscillations are not accounted for in terms of the phasing, frequency and amplitude of the pressure oscillations across the CPV, then the CPV may open and close at random points on the pressure wave, as illustrated by filled circles 210. While not all CPV opening/closing events in such a scenario may occur when pressure across the CPV is greatest, some percentage (see 210a, 210b, and 210c) will, and opening/closing the CPV under such conditions may disproportionately adversely impact CPV durability as well as contribute to NVH issues.

Alternatively, by synchronizing the PWM signal to the CPV with the frequency and phasing of the pressure oscillations, the CPV may be phased to open and close when pressure across the CPV is low in terms of the pressure oscillations, illustrated by the open circles 205. In this way, CPV degradation may be reduced over time, and as a result, engine operation may be improved and undesired evaporative emissions (which may occur in certain cases where the CPV becomes degraded) may be reduced. Furthermore, NVH issues may additionally be reduced or avoided.

While illustration 200 depicts a situation where smaller pressure oscillations are on top of a larger vacuum, the systems and methods discussed herein are not limited to such an event. It may be understood instead that the systems and methods discussed herein in a broad sense refer to timing opening and closing events of the CPV (and in other cases the TPCV, which will be discussed in further detail below) to coincide with times when pressure differences across the CPV (or TPCV) are low as compared to high in terms of pressure oscillations across the particular valve.

Accordingly, inset 250 represents the concept in a different way, to illustrate pressure 252 across the CPV increasing (+) or decreasing (-), over time. Depicted as open circles 255, are times when the CPV may be opened or closed to coincide with low pressure differences across the CPV as compared to high pressure differences. As will be discussed in more detail below, there may be a threshold pressure difference 256, where above the threshold pressure difference comprises the high pressure difference 260, and where below the threshold pressure difference comprises the low pressure difference 261. As one example, the threshold pressure difference may be set after determining an amplitude, phase and frequency of the pressure oscillations, and may include setting the threshold pressure difference based on inflection points (depicted as arrows 257) of the pressure oscillation wave. It may be understood that setting the threshold pressure difference may not be limited to only relying upon inflexion points, but may be set to be lower than the inflexion points (thus reducing an amount of time where the CPV may be timed to open and close while coinciding with the low pressure differences). It may be understood that in setting the threshold pressure difference, a time duration (indicated by dashed lines 258 may additionally be set corresponding to when the CPV may be opened and/or closed to coincide with the low pressure differences as compared to high pressure differences. Said another way, above the threshold pressure difference 256, the CPV may be prevented from being commanded from opening and closing, whereas below the threshold pressure difference 256, the CPV may be commanded to open and close such that the opening and closing events are synchronized with the low pressure differences 261 across the CPV as compared to high pressure differences 260. It may be further understood that as one or more of the frequency, amplitude and phase of the pressure oscillations changes, so too may the pressure difference threshold. In other words, the pressure difference threshold may be adjusted as a function of changes in one or more of the frequency, phase and amplitude of the pressure oscillation wave.

As mentioned above and will be discussed in further detail below, while inset 250 was discussed with regard to the CPV, the concepts additionally apply to the TPCV. In other words, the TPCV may be controlled to time opening and closing events to coincide with low pressure differences (e.g. 261) across the TPCV in terms of pressure oscillations (e.g. 252), as compared to high pressure differences (e.g. 260) when conducting a fuel tank depressurization operation.

Furthermore, as will be discussed in greater detail below, it is herein recognized that under cases where the CPV (or in other examples the TPCV) is indicated to be degraded, or in other words, not sealing as expected or desired, a cleaning operation may include commanding the opening and closing events of the CPV (or in other examples the TPCV), to coincide with the high pressure differences (e.g. 260) across the particular valve during purging and/or fuel tank depressurization operations. In this way, residual buildup, debris, etc., may be removed from the particular valve which may return the valve to a state where degradation is not indicated, or in other words where the particular valve is indicated as sealing as desired or expected.

While synchronizing the PWM signal to the CPV with the frequency and phase of pressure oscillations may improve CPV durability and reduce NVH issues, in hybrid vehicles with limited engine run time opportunities for purging may be limited. Thus, it may be desirable in certain cases to aggressively purge the canister without necessarily synchronizing the PWM signal to the CPV with the frequency and phasing of pressure oscillations, while still avoiding opening/closing the CPV when pressure across the CPV due to pressure oscillations is greatest. Said another way, one way to avoid opening/closing the CPV during a purge event when pressure across the CPV due to pressure oscillations is greatest may be to immediately command the CPV to a 100% duty cycle (or in other words, command the CPV to a fully open position) in response to a request to purge the canister provided conditions are met for doing so. In this way, the CPV may be prevented from being opened/closed when pressure across the CPV is greatest, however such a strategy is not amenable to most vehicle operating conditions because immediately commanding a 100% duty cycle (without first commanding lower percentage duty cycles) under most vehicle operating conditions is likely to result in degraded control of engine air/fuel ratio and an increased potential for poor drivability such as engine hesitation, stall, etc.

More specifically, for controlling air-fuel ratio during canister purging events to avoid drivability issues related to engine hesitation and/or stall, the duty cycle of the CPV is generally ramped from a low initial duty cycle to a high duty cycle over time, based on feedback from an exhaust gas sensor (e.g. 64). In this way, a concentration of vapors stemming from the canister en route to the engine may be learned, and the learned vapor concentration may be used to adjust fueling to the engine to maintain a desired air-fuel ratio. Furthermore, the learned vapor concentration may be used to estimate canister loading state. However, there are many situations in hybrid vehicles where the engine may be deactivated during a purge ramp, prior to the CPV duty cycle reaching a level (e.g. greater than 90% duty cycle) where the canister may be effectively cleaned of fuel vapors. As one example, a start/stop event for vehicles equipped with such capability may occur during a purging event, where the engine is shut down when vehicle speed is below a threshold speed (e.g. at a stop light) and thus the purging operation is discontinued. If the start/stop event occurs prior to the canister being sufficiently cleaned of fuel vapors (e.g. cleaned to less than 5% loaded), then another purging event may be initiated at the next available opportunity, where the ramping procedure is initiated all over again. Thus, hybrid vehicles with limited engine run time present challenges for effectively cleaning the fuel vapor storage canister, and such issues may in some examples undesirably result in bleed-emissions from the canister to atmosphere.

Thus, while synchronizing the PWM signal to the CPV during purging events may reduce degradation of the CPV over time, there may still be issues related to insufficient canister purging where the vehicle undergoing purging is a hybrid vehicle. Thus, it is herein recognized that there are certain examples of vehicle operating conditions for which the CPV may be immediately stepped to a 100% duty cycle in response to a request for purging the canister. Immediately stepping to a 100% duty cycle may serve to aggressively clean the canister, and may further reduce opportunities where opening and closing the CPV may occur under conditions where pressure across the CPV due to pressure oscillations is greatest (e.g. 210a, 210b, 210c), which may reduce the potential for CPV degradation.

One such condition where the CPV may immediately be stepped to a 100% duty cycle in response to a request for purging includes a remote start event where the engine is activated, but there are no occupants in the vehicle. In such a case, even if purging the canister at a 100% CPV duty cycle were to result in engine hesitation or even stall, there would not be any occupant to notice the issue. For example, in the event of an engine stall, the engine may be rapidly re-activated to combust air and fuel without adverse effects. However, a contingency is that such an example relies on the exhaust catalyst being above its light-off temperature so that combusted gasses may be transformed to less polluting gasses.

Another such condition includes deceleration fuel shut off (DFSO) events where fueling and spark is discontinued to the engine, but where intake and exhaust valves continue to operate (e.g. continue to open and close). In such an example, provided the exhaust catalyst is above its light-off temperature, the contents of the canister may be purged to the exhaust where the exhaust catalyst transforms the fuel vapors into gasses that are less polluting, even though the fuel vapors are not combusted. In both examples, the canister may be aggressively purged to thoroughly clean the canister while at the same time reducing opportunities for opening and closing the CPV under conditions where pressure across the CPV due to pressure oscillations is greatest. As discussed, such cleanings may be particularly desirable for hybrid vehicles with limited engine run time, as such vehicles may not otherwise find opportunities to completely purge the canister.

Accordingly, turning now to FIG. 3, a high-level example method 300 is shown for determining whether to aggressively purge the canister or to synchronize the PWM signal to the CPV with a frequency and phasing of pressure oscillations across the CPV for a purging event. Specifically, in response to a request to purge the canister, method 300 may include determining whether the vehicle is in a condition of a remote start, or a DFSO event. If so, method 300 may proceed to FIG. 4 where method 400 may be used to aggressively purge the canister. Alternatively, if a remote start or DFSO event is not indicated, method 300 may be used to synchronize the PWM signal to the CPV with the frequency and phase of pressure oscillations across the CPV, in order to purge the canister. If, while the PWM to the CPV is synchronized to the frequency of pressure oscillations a DFSO event is initiated, then method 300 may proceed to FIG. 4 where the CPV may be controlled to 100% duty cycle to aggressively purge the canister.

Method 300 will be described with reference to the systems described herein and shown in FIG. 1, though it should be understood that similar methods may be applied to other systems without departing from the scope of this disclosure. Method 300 may be carried out by a controller, such as controller 12 in FIG. 1, and may be stored at the controller as executable instructions in non-transitory memory. Instructions for carrying out method 300 and the rest of the methods included herein may be executed by the controller based on instructions stored on a memory of the controller and in conjunction with signals received from sensors of the engine system, such as the sensors described above with reference to FIG. 1. The controller may employ actuators such as fuel injectors (e.g. 45), spark plug (e.g. 53), first oil pressure-controlled actuator (e.g. 183), second oil pressure-controlled actuator (e.g. 184), CPV (e.g. 92), CVV (e.g. 87), FTIV (e.g. 85), throttle (e.g. 42), etc., to alter states of devices in the physical world according to the methods depicted below.

Method 300 begins at 305 and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 310, method 300 incudes indicating whether a canister purging event is requested. A canister purging request may be received via the controller 12, in response to an indication of a canister loading state above a threshold loading state (e.g. greater than 50% full, greater than 60% full, greater than 70% full, etc.), in response to an indication that a predetermined amount of time has elapsed since a prior canister purging operation, etc. If, at 310, a request for canister purging is not indicated, method 300 may proceed to 315. At 315, method 300 may include maintaining current vehicle operating conditions. For example, if the vehicle is being operated by one of the engine, motor, or some combination, such operation may be maintained. Method 300 may then end.

Returning to 310, in response to an indication of a request to purge the canister, method 300 may proceed to 320. At 320, method 300 may include indicating if the vehicle is in the process of a remote start event. For example, upon actuation of a remote start button (e.g. 105) on a key fob (e.g. 104), a remote signal may be transmitted from the key fob and, if within range, received by a remote engine start receiver (e.g. 195) in the vehicle. Upon receiving the remote signal, the engine start receiver may alert the vehicle controller to start the engine. In other examples a remote start may be initiated via a cellular telephone, or smartphone based system where a user's cellular telephone sends data to a server and the server communicates with the vehicle to start the engine. If, at 320 it is indicated that the vehicle is in the process of a remote start, method 300 may proceed to FIG. 4, where method 400 may be used to aggressively purge the canister.

Alternatively, if at 320 it is indicated that the vehicle is not in the process of a remote start event, method 300 may proceed to 325. At 325, method 300 may include indicating whether a request to enter into a DFSO mode of operation has been requested and received via the controller. For example, DFSO entry conditions may be based on various vehicle and engine operating conditions. In particular, the routine may use a combination of one or more of vehicle speed, vehicle acceleration, engine speed, engine load, throttle position, pedal position, transmission gear position, and various other parameters to determine whether DFSO entry conditions have been met at 325. In one example, when vehicle-operator demanded torque falls below a predetermined threshold torque while the vehicle is being propelled at least in part via the engine, then the engine may enter into the DFSO mode of operation. If, at 325, it is indicated that DFSO mode entry conditions are met, then method 300 may proceed to FIG. 4 where method 400 may be used to aggressively purge the canister.

If, at 325, conditions are not indicated to be met for entering into DFSO mode, method 300 may proceed to 330. At 330, method 300 may include indicating whether conditions are met for conducting the requested canister purging operation. Conditions being met for conducting a canister purging operation may include an indication of an intake manifold vacuum greater than a threshold intake manifold vacuum. The threshold intake manifold vacuum may include an intake manifold vacuum that is great enough to enable fuel vapors to be drawn from the fuel vapor storage canister and routed to engine intake. The threshold intake manifold vacuum may be determined via the MAP sensor (e.g. 39), for example. Conditions being met for purging the canister at 330 may further include an indication that the engine is combusting air and fuel. Conditions being met for purging the canister at 330 may further include an indication that a temperature of the emissions control device (e.g. 63) is greater than a light-off temperature, the light-off temperature comprising a temperature at which the emissions control device effectively transforms exhaust gasses into less polluting gasses.

If, at 330, conditions are not indicated to be met for purging the canister, method 300 may proceed to 315. At 315, method 300 may include maintaining current vehicle operating conditions. For example, if the engine is not combusting air and fuel and/or if the vehicle is being propelled via the motor, such operating conditions may be maintained. The CPV may be maintained closed. Method 300 may then end. However, it may be understood that the purging operation may be conducted at a next opportunity when conditions are indicated to be met for conducting the purging operation.

Returning to 330, in response to conditions being met for conducting the canister purging operation, method 300 may proceed to 332. At 332, method 300 may indicate whether a CPV cleaning routine has been requested. As will be discussed in further detail below, the CPV cleaning routine may be requested in response an indication that the CPV is not sealing as desired or expected (in other words, degraded sealing). If a CPV cleaning routine is requested, method 300 may proceed to FIG. 9, where the canister may be purged and cleaned according to the instructions at FIG. 9. It may be understood that degraded sealing of the CPV may be indicated in response to a fuel system pressure reaching a predetermined negative threshold pressure, with the CPV closed and the CVV closed, under conditions where the engine is operating and communicating a vacuum at the CPV. Because the predetermined negative threshold pressure is reached in the fuel system, the CPV is exhibiting degraded sealing because if the CPV was not exhibiting degraded sealing, the predetermined negative threshold pressure would not be expected to be reached in the fuel system.

Alternatively, if a CPV cleaning routine is not requested at 332, method 300 may proceed to 335. At 335, method 300 may include determining a frequency, phasing and amplitude of pressure oscillations across the CPV.

In one example, determining a frequency, phasing and amplitude of pressure oscillations across the CPV may include mapping out or modelling the frequency, phasing and amplitude of pressure oscillations based on one or more pertinent variables which may be available from the controller. For example, as discussed above, the amplitude, frequency and phasing of pressure oscillations across the CPV are a function of at least engine speed, engine load, cam timing, ambient temperature, engine firing frequency (forcing frequency), temperature of gas in the intake and purge line, etc. Engine speed (RPM) may be determined via the crankshaft position sensor (e.g. 197). Engine load may be determined at least based on engine speed, mass air flow as determined via the MAF sensor (e.g. 58) and position of the throttle (e.g. 42). Cam timing may be determined based on position sensors (e.g. 98, 99) configured to determine position of intake and exhaust valve actuators (e.g. 83, 84), and may be a function of a schedule for controlling the first oil pressure-controlled actuator (e.g. 183) that regulates rotation of the intake camshaft (e.g. 181), and a schedule for controlling the second oil pressure-controlled actuator (e.g. 184) that regulates rotation of the exhaust camshaft (e.g. 182). Ambient temperature may be determined via the ambient air temperature sensor (e.g. 107), firing frequency may be inferred based on fuel injection schedule and spark schedule, and temperature of gas in the intake and purge line may be indicated via the intake temperature sensor (e.g. 109).

Many of the above variables may be cross-correlated with one another. For example, variable cam timing may be scheduled as a function of engine speed and load. The engine firing frequency may change in conjunction with engine speed. Thus, based on the information related to the above-mentioned variables being obtained at the controller, pressure oscillations across the CPV may be inferred since the above-mentioned variables all affect the frequency, phasing, and amplitude of the pressure oscillations across the CPV.

However, precisely mapping out the frequency, phasing and amplitude of pressure oscillations across the CPV based on the above-mentioned variables may be challenging due to the multiple contributing factors. Thus, in one example, a purge line pressure sensor (e.g. 67) may be included in the evaporative emissions system, and may be used for mapping the frequency, phasing and amplitude of pressure oscillations and/or for feedback control. More specifically, in terms of feedback control the above-mentioned variables that contribute to pressure oscillations across the CPV may be mapped out as discussed, and the modeled pressure oscillations may be further updated based on feedback from the purge line pressure sensor. Feedback from the purge line pressure sensor may help to refine the model particularly in terms of the phasing of the pressure oscillations.

In another example, the pressure oscillations across the CPV may be determined based on two pressure sensors, for example the MAP sensor (e.g. 39) in the intake of the engine and the FTPT (e.g. 23) positioned in the fuel system. In order to rely on such dual sensors to determine pressure oscillations across the CPV, it may be desirable for the canister-side of the evaporative emissions system (which includes the evaporative emissions system upstream of the CPV) to be at or near (less than 2% different) atmospheric pressure. Thus, for vehicles with an FTIV (e.g. 85) where the FTPT is positioned between the fuel tank and the FTIV, the FTIV may be commanded open for determining pressure oscillations across the CPV, which also couples the fuel system to atmosphere via an open CVV (e.g. 87) to relieve pressure in the fuel system and evaporative emissions system to atmospheric pressure. Pressure oscillations may be thus determined as a difference between MAP and FTPT, corrected for an offset, the offset comprising a modelled restriction of the canister buffer section (e.g. 90a). However, there may be situations where it is not desirable to couple the evaporative emissions system to the fuel system via commanding open the FTIV. Examples may include situations where the canister is more than a threshold amount full of fuel vapors, for example when the fuel vapor canister is saturated with fuel vapors. Thus, in some examples the two pressure sensors relied upon for determining pressure oscillations across the CPV may include the MAP sensor and pressure sensor 126 positioned in conduit 93 between the FTIV and canister 90.

It may be understood that any one or more of the above-mentioned approaches may be used, alone or in combination, to determine the frequency, phasing and amplitude of the pressure oscillations across the CPV.

With the frequency and phasing of the pressure oscillations across the CPV having been determined at 335, method 300 may proceed to 340. At 340, method 300 may include synchronizing CPV opening/closing events, or in other words synchronizing the PWM signal to the CPV, with the frequency and phasing of the pressure oscillations determined at 335. More specifically, step 340 may include setting the threshold pressure difference (e.g. 256) as a function of the amplitude, frequency and phasing of the pressure oscillations, and then controlling the PWM signal to the CPV to time opening and closing events of the CPV to coincide with low pressure differences (e.g. 261) across the CPV, as compared to high pressure differences (e.g. 260) across the CPV. As discussed above, canister purging events may comprise a strategy where a duty cycle of the CPV is ramped up over time, as a function of feedback from the exhaust gas sensor in order to maintain a desired air-fuel ratio during the purging so as to avoid drivability issues. Accordingly, turning to FIG. 5A, an example timeline 500 is depicted, illustrating how a PWM signal to the CPV may be controlled such that opening/closing events of the CPV are concurrent with lowest pressure differences across the CPV in terms of the pressure oscillations across the CPV as determined at 335 of method 300, while additionally ramping up the duty cycle over time. It may be understood that opening/closing events of the CPV being concurrent with lowest pressure differences may comprise the opening/closing events of the CPV being within a threshold time of the lowest pressure differences.

Example timeline 500 includes plot 505, indicating frequency, phasing and amplitude of pressure oscillations across the CPV, determined for example as according to step 335 of method 300. As discussed above with regard to FIG. 2, for canister purging events there may be a vacuum across the CPV, on top of which are the smaller pressure oscillations. Accordingly, pressure across the CPV as depicted at FIG. 5A is negative (–), or more negative (– – –), over time. Timeline 500 further includes plot 510, indicating CPV status (open or closed), over time. The threshold pressure difference is indicated as dashed line 511. While pressure across the CPV is depicted as negative (–) or more negative (– – –), it may be understood that pressure differences may alternatively be represented as per inset 250 of FIG. 2, without departing from the scope of this disclosure. As depicted at FIG. 5A, it may thus be understood that pressure differences across the CPV are low pressure differences 512 as compared to high pressure differences 513, in relation to the threshold pressure difference 511.

At time t0, it may be understood that a canister purging event is requested, and frequency, amplitude and phasing of pressure oscillations across the CPV have been determined as discussed above with regard to step 335 of method 300, and the threshold pressure difference 511 has been set. Between time t0 and t1, the CPV is controlled to open and close at a low initial duty cycle, where the opening and closing events of the CPV are concurrent, or coincide, with the points on the pressure oscillation wave (plot 505) that comprise points where pressure differences across the CPV are low as compared to high. Solid lines 507 represent a threshold range for which the CPV may be opened/closed and still coincide with the lowest pressure differences across the CPV. Stars 508 depict the opening/closing events of the CPV, for clarity. By initiating the CPV opening/closing events at a low duty cycle, the potential for engine hesitation and/or stall may be reduced. As time goes on in the purging operation, the concentration of vapor stemming from the canister is learned based on feedback from the exhaust gas sensor and the duty cycle is correspondingly increased and air-fuel ratio compensated by controlling fuel injection (not shown) to engine cylinders such that a desired air-fuel ratio is maintained over the course of the purging.

Accordingly, between time t1 and t2, the duty cycle of the CPV is increased, while still maintaining opening/closing events concurrent with the lowest or low pressure differences across the CPV in terms of the pressure oscillations.

It may be understood that in order to maintain opening/closing events of the CPV concurrent with the low pressure differences across the CPV between time t1 and t2, the frequency of opening/closing events may be altered. In other words, the frequency of PWM signal to the CPV comprises a first frequency between time t0 and t1, and then is changed to a second frequency between time t1 and t2. Additionally, between time t0 and t1, the CPV is controlled at a first duty cycle, whereas between time t1 and t2, the CPV is controlled at a second duty cycle. Clearly, the first duty cycle and the second duty cycles are constrained by the instructions to time opening and closing events of the CPV with times where pressure differences across the CPV are low in terms of the pressure pulsations across the CPV. In other words, the choice of duty cycle is not arbitrary, but is constrained by the frequency, phasing and amplitude of the pressure pulsations.

This is again seen between time t2 and t3, where the frequency of opening/closing the CPV changes to a third frequency between time t2 and t3, and where the duty cycle is commanded to change to a third duty cycle between time t2 and t3. Between time t2 and t3, it may be seen that in order to increase duty cycle, or in other words, increase the time that the valve stays open for each opening event followed by a closing event, the frequency changes in order to time CPV opening and closing events to coincide with low pressure differences in terms of the pressure pulsations across the CPV. Only a portion of the purging operation is shown at FIG. 5A for illustrative purposes, but it may be understood that after time t3 the duty cycle of the CPV may be further increased, until eventually the duty cycle may comprise a 100% duty cycle. The canister purging operation may proceed in this way until canister load is below the threshold load (e.g. less than 5% loaded with fuel vapors), provided that engine operating conditions do not change such that canister purging is aborted, such as may occur in a hybrid vehicle in response to a start/stop event for example.

Thus, FIG. 5A depicts a situation where frequency of opening/closing events is equal to or less than the frequency of pressure pulsations across the CPV.

Turning to FIG. 5B, another example timeline 525 is illustrated, depicting plot 530, illustrating pressure pulsations across the CPV over time (similar to the pressure pulsations at FIG. 5A), plot 535, illustrating whether the CPV is open or closed over time, and plot 540, illustrating a voltage commanded to the CPV, or in other words, to a solenoid actuator (not shown) of the CPV, to control opening/closing events. The voltage command is sent to the CPV based on instructions from the controller (e.g. 12), as a function of desired duty cycle and as a further function of timing opening/closing events of the CPV with the times of low pressure differences 532 as compared to high pressure differences 533 across the CPV during a purging event of the fuel vapor storage canister, as related to a threshold pressure difference 531. Timeline 525 is similar to timeline 500 in that it depicts a snapshot of a purge event, illustrating a transitioning from a first frequency of the CPV opening/closing events between time t0 and t1 to a second frequency of the CPV opening/closing events between time t1 and t2. Accordingly, the duty cycle between time t0 and t1 comprises a first, lower duty cycle, than the second, higher duty cycle between time t1 and t2. Stars 532 represent opening/closing events of the CPV, along the pressure pulsation wave depicted by plot 530. Timeline 525 again depicts an example where frequency of opening/closing events is equal to or less than the frequency of pressure pulsations across the CPV.

Between time t0 and t1, the frequency of CPV opening/closing is matched with the frequency of pressure pulsations such that each event of the pressure pulsations comprising a low pressure difference across the CPV coincides with both an opening and closing of the CPV. Accordingly, voltage pulses to the CPV are timed to both open the CPV and then close the CPV during time periods where pressure is low in terms of the pressure pulsations across the CPV.

Between time t1 and t2, the frequency of opening/closing events of the CPV is lowered to the second frequency, while maintaining opening/closing events coinciding with the times of low pressure difference across the CPV in terms of the pressure oscillations across the CPV. In this way, the duty cycle of the CPV is increased such that the CPV spends more time in the open state between time t1 and t2 as compared to between time t0 and t1. Between time t1 and t2, it can be seen that voltage is commanded to the CPV to open the CPV, and is maintained until the next region of low pressure difference across the CPV, when the voltage is stopped from been commanded to the CPV. In this way, by controlling voltage commands to the CPV, or in other words, by controlling voltage commands to the CPV solenoid (not shown), frequency and duty cycle of the CPV may be controlled as a function of the pressure pulsations across the CPV.

Turning now to timeline 550 at FIG. 5C, it depicts an example timeline for conducting a purging operation of a fuel vapor storage canister where frequency of CPV pulsing is greater than the frequency of the pressure pulsations across the CPV, such that the frequency of CPV pulsing does not have to be altered in order to increase open time for the CPV during a purge ramp that may be desired during a purge event of the fuel vapors storage canister.

Timeline 550 depicts plot 555, illustrating pressure pulsations across the CPV, over time. It may be understood that the pressure pulsations are similar in nature to the pressure pulsations depicted at FIG. 2 and FIGS. 5A-5B. Timeline 500 further depicts plot 560, illustrating whether the CPV is open, or closed, over time. Plot 565 depicts voltage applied to the CPV to actuate the CPV open/closed.

Arrow 556 depicts a range (between two lines 558) corresponding to the low pressure difference across the CPV in terms of the pressure pulsations where it may be desirable to conduct CPV opening/closing events. The range may be set based on a threshold pressure difference (not shown at FIG. 5C but see for example 531 depicted at FIG. 5B). This range comprises a first range between time t0 and t1, and a second range between time t1 and t2. For clarity, only two opening/closing events of the PCV are depicted via plot 560 (solid lines), however plot 560 is illustrated as dashed lines at other regions where the CPV may be opened/closed, but which are not specifically discussed in terms of the voltage applied to the CPV in order to actuate the CPV open/closed. For plot 560, lines 561 illustrate regions outside of where the CPV is actually opened, and dashed lines 566 illustrate how voltage is applied between lines 561. Arrows 567 depict points when a duty cycle of the CPV is increased to open the CPV. Between lines 561 and 558, represented as arrow 562, it is illustrated that voltage pulses are applied to the CPV, but do not result in the CPV opening. It is in this way that frequency may be maintained unchanged while duty cycle is controlled in order to control the CPV opening/closing to coincide with low pressure regions in terms of the pressure pulsations across the CPV.

Thus, FIG. 5C is similar to FIG. 5B in that CPV open time is increased over time, enabling a ramping up of the amount of vapors directed to engine intake during purging of the canister, based on feedback from the exhaust gas sensor. As depicted between time t0 and t1, between lines 561 and 558, voltage pulses are applied to the CPV, but they are not of a duration sufficient to actually open the CPV. While lines 561 are depicted for illustrative purposes, it may be understood that the short pulses may occur anywhere along plot 560 where the CPV is not actually indicated to be opened. Thus, it may be understood that, between time t0 and t1, voltage pulses are repetitively applied to the CPV as depicted between lines 561 and 558, at a particular frequency, but that the pulses are of a short enough duration such that the CPV does not actually open. Between lines 558, represented by arrow 556, voltage pulses to the CPV are of a longer duration, or in other words, CPV duty cycle increases, which results in the CPV actually opening within the time defined by arrows 567. In this way, the CPV is opened at a time coinciding with low pressure differences across the CPV in terms of the pressure oscillations.

A similar methodology is depicted between time t1 and t2, but the CPV is held open for an overall greater period of time, such that the CPV opens at one point 557 when pressure across the CPV is low in terms of pressure pulsations across the CPV, and then closes at another point 559 when pressure across the CPV is low in terms of the pressure pulsations across the CPV. In this way, CPV duty cycle may change without changing frequency, where when the CPV is not desired to be opened, the timing of the voltage pulse to the CPV is of a short enough duration so as to not result in the CPV physically opening.

It may be understood that FIG. 5C depicts a short portion of a canister purging operation, and it may be further understood that similar methodology may be used to ramp up an amount of purge vapors directed to engine intake during purging of the canister.

Turning now to FIG. 5D, it depicts another example timeline 575 of a canister purging operation, but where frequency at which the CPV opens is lower than (and not equal to) frequency of the pressure oscillations across the CPV. In such an example, the CPV frequency may stay the same while a duty cycle is increased over the course of the purging operation.

Plot 580 depicts pressure across the CPV, over time. Specifically, as per FIG. 2 and FIGS. 5A-5C, the pressure pulsations across the CPV at plot 580 depict frequency, phasing and amplitude of pressure oscillations across the CPV, determined for example as according to step 335 of method 300. As discussed above with regard to FIG. 2, for canister purging events there may be a vacuum across the CPV, on top of which are the smaller pressure oscillations. Accordingly, pressure across the CPV as depicted at FIG. 5D is negative (-), or more negative (---), over time. Alternatively, plot 580 may instead be depicted as per inset 250 at FIG. 2, without departing from the scope of this disclosure. Timeline 575 further includes plot 585, indicating CPV status (open or closed), over time, and plot 590, indicating voltage commanded to the CPV in order to induce CPV opening/closing, over time. Stars 581 depict time points where the CPV opens and/or closes, over time.

Between time t1 and t2, there are two points where the CPV opens and then closes, coinciding with (see stars 581) CPV low pressure differences across the CPV in terms of the pressure oscillations or pulsations. At time t2, the duty cycle of the CPV is altered, without changing CPV opening frequency. CPV duty cycle is again altered between time t3 and t4, such that the duty cycle increases, for the same frequency of CPV opening. In other words, only the duty cycle is changed in going from the duty cycle between time t2 and t3, to the duty cycle between time t3 and t4. Duty cycle is further increased in similar fashion between time t4 and t5.

In this way, when frequency of the CPV is lower than the pressure oscillations across the CPV, duty cycle may be adjusted without changing the CPV frequency. However, the duty cycle may still be constrained by the frequency of pressure oscillations across the CPV, such that the CPV is only opened/closed when pressure across the CPV is low in terms of the pressure pulsations across the CPV. By increasing duty cycle over time, a purge ramp process may be conducted, as discussed above, without having to alter frequency of the CPV pulsing.

Thus, FIGS. 5A-5D depict examples of how the CPV may be controlled to time opening/closing events with low pressure differences across the CPV in terms of the pressure pulsations during purging, while still allowing for a ramping up of the amount of vapors directed to engine intake over time.

Returning to 340 of method 300, with CPV opening/closing synchronized with the frequency and phasing of the pressure oscillations, method 300 may proceed to 345. At 345, method 300 includes indicating whether the canister load is below the threshold canister load. Canister load may be inferred based on the exhaust gas sensor, for example. More specifically, when a concentration of vapors being inducted to engine intake from the canister have become such that compensatory adjustments to fueling are no longer requested to maintain desired air-fuel ratio, then the controller may infer canister load is below the threshold canister load. Additionally or alternatively, a canister temperature sensor (e.g. 97) may be relied upon to infer when canister load is below the threshold canister load. Specifically, the process of fuel vapor desorption via the canister results in heat being consumed and thus the canister is cooled during purging. Thus, temperature change rate at the canister as monitored via the canister temperature sensor may be used to infer when the canister load is below the threshold load. For example, when the temperature change rate is below a threshold temperature change rate (e.g. not changing by more than 5% or less), then it may be indicated that canister load is below the threshold load.

If, at 345, canister load is not indicated to be below the threshold canister load, method 300 may proceed to 347. At 347, it may be indicated as to whether a request to enter into a DFSO operational state has been received by the controller. A DFSO event may be requested responsive to a vehicle operator releasing the accelerator pedal for example, and in response, fuel injection to the engine may be stopped. More specifically, the controller may send a signal to the fuel injectors, actuating the fuel injectors to cease fuel injection to engine cylinders. Spark may be additionally discontinued. Fuel injection (and spark) may then be reactivated responsive to the vehicle operator depressing the accelerator pedal, or responsive to engine RPM dropping below a predetermined speed (e.g. 2000 RPM or less). During DFSO events, the fuel pump (e.g. 21) may be deactivated as well.

If, at 347, a DFSO event is indicated to be requested, method 300 may proceed to FIG. 4, where method 400 may be used to aggressively purge the canister by immediately stepping the CPV duty cycle to 100%, discussed in further detail below. Alternatively, if a DFSO event is not indicated, method 300 may return to step 335, where the frequency, phasing and amplitude of pressure oscillations across the CPV are continued to be determined. In other words, during the process of purging the canister, frequency, amplitude and phase of pressure oscillations across the CPV may change based on engine operating conditions and driver demand. Further, the act of purging the canister itself may influence the frequency, amplitude and phase of the pressure oscillations. As one example, as the process of fuel vapor desorption from the canister results in a cooling effect, temperature of gas in the intake and purge line may change (e.g. become cooler). As temperature of gas in the intake and purge line is one of the variables mentioned above that may influence the frequency and phase of pressure, purging the canister may alter the frequency and phase of the pressure oscillations initially determined at step 335. Thus, it may be understood that the controller may continually update the frequency, amplitude and phase of pressure oscillations across the CPV during the course of any purging operation. As frequency, amplitude and phase of the pressure oscillations is continually updated, the controller may continue to control the PWM signal to the CPV at step 340 in order to maintain the CPV opening/closing events in synchrony with the lowest pressure differences across the CPV. This may include adjusting the threshold pressure difference, in order to maintain the CPV opening/closing events to coincide with low pressure differences across the CPV as compared to high pressure differences in relation to the threshold pressure difference. Thus, it may be understood that steps 335-347 and returning to step 335 may comprise a feedback loop where frequency, amplitude and phase of pressure oscillations across the CPV are continually updated, and where PWM signal to the CPV is continually controlled to maintain CPV opening and closing events in synchrony with (e.g. corresponding with instances of) low pressure differences in terms of the pressure oscillations across the CPV.

It may be understood that as frequency, amplitude and phase of pressure oscillations change during the course of a canister purging operation, frequency of the PWM signal to the CPV along with duty cycle may be altered via the controller in order to maintain CPV opening/closing events in synchrony with the lowest pressure differences across the CPV in terms of the pressure oscillations.

While not explicitly illustrated, it may be understood that during the course of conducting the canister purging operation, if vehicle operating conditions change such that canister purging is no longer possible, for example if the engine is stopped in response to a start/stop event, or if vehicle operator requested engine torque changes (e.g. a tip-in event where the accelerator pedal is depressed) such that intake manifold vacuum is no longer sufficient for canister purging, then the canister purging operation may be aborted.

Returning now to step 345, if while conducting the canister purging operation, canister load is indicated to be below the threshold canister load, method 300 may proceed to 350. At 350, method 300 may include discontinuing the purging operation. Discontinuing the purging operation may include commanding the CPV closed. Proceeding to 355, method 300 may include updating vehicle operating conditions. For example, a canister purging schedule may be updated to reflect the current loading state of the canister. Method 300 may then end.

As depicted at FIG. 3, a remote start (step 320) or a DFSO event may trigger the controller to purge the canister according to the method depicted at FIG. 4. While a remote start event includes vehicle operating conditions that are distinct from a DFSO event, the method of aggressively purging the canister according to FIG. 4 in general applies to both vehicle operating conditions. Accordingly, in discussing method 400 depicted at FIG. 4, any differences in how the method is conducted depending on whether the purging operation is conducted in response to a remote start event or a DFSO event, will be discussed.

Accordingly, proceeding to FIG. 4, it illustrates method 400 which may be used to aggressively purge the canister under conditions where either engine stability issues may be likely to go unnoticed by any vehicle operator or passenger (e.g. remote start event), or where engine stability issues may be avoided due to the engine not combusting air and fuel (e.g. DFSO event). As method 400 continues from method 300 depicted at FIG. 3, method 400 is described with reference to the system shown in FIG. 1, is carried out by controller 12, and is stored at the controller as executable instructions in non-transitory memory. Instructions for carrying out method 400 and the rest of the methods included herein may be executed by the controller based on instructions stored on a memory of the controller and in conjunction with signals received from sensors of the engine system, such as the sensors described above with reference to FIG. 1. The controller may employ actuators such as fuel injectors (e.g. 45), spark plug (e.g. 53), first oil pressure-controlled actuator (e.g. 183), second oil pressure-controlled actuator (e.g. 184), CPV (e.g. 92), CVV (e.g. 87), FTIV (e.g. 85), throttle (e.g. 42), etc., to alter states of devices in the physical world according to the methods depicted below.

Method 400 begins at 405 and includes indicating whether conditions are met for aggressively purging the canister. Conditions common for both a remote start event and a DFSO event may include an indication that the emissions control device (e.g. 63) is above a desired operating temperature (e.g. at or above the light-off temperature), and an indication that intake manifold vacuum is sufficient for purging the canister. Conditions specific to a remote start event may include an indication that the vehicle is not occupied. Such an indication may be provided via one or more of seat load cells (e.g. 121), door sensing technology (e.g. 122) and/or onboard cameras (e.g. 123).

If, at 405, conditions are not met for aggressively purging the canister, method 400 may proceed to 410, where current vehicle operating conditions may be maintained. Method 400 may then end. However, while not explicitly illustrated, in some examples, if conditions are not met due to the emissions control device being at a temperature below the light-off temperature, method 400 may proceed to 410 where current vehicle operating conditions are maintained with the exception that an electric heater (e.g. 119) coupled to the emission control device may be activated to raise temperature of the emission control device to or above the light-off temperature. In another example that includes the remote start event, ignition timing may be retarded to rapidly warm the emissions control device, in lieu of or in addition to use of the electric heater. Accordingly, in such cases, method 400 may return to step 405 where method 400 includes continuing to query whether conditions are met for canister purging, indicated by dashed line 411.

Responsive to conditions being met for aggressively purging the canister at 405, method 400 may proceed to 415. At 415, method 400 may include commanding closed the throttle (e.g. 42), and may further include commanding open or maintaining open the CVV. More specifically, the throttle may be commanded closed in order to increase the amount of intake manifold vacuum applied to the canister.

Proceeding to 420, method 400 may include commanding the CPV to a 100% duty cycle, or in other words, commanding the CPV fully open. As discussed above, there are a couple benefits to aggressively purging the CPV via immediately stepping to a 100% duty cycle. First is that the ramping process of sequentially increasing the duty cycle over time is avoided, thus canister purging may be more rapidly conducted and thus the potential for the purging operation to be aborted may be reduced. Another is that with the CPV being commanded fully open, issues related to opening/closing the CPV at points where pressure across the CPV is greatest in terms of pressure oscillations may for the most part be avoided. However, when commanded to 100% duty cycle, the CPV has to be opened once, and closed once. There is thus a small possibility that one of the opening event and/or closing event may coincide with a greatest pressure difference across the CPV in terms of pressure oscillations. Thus, in one example at 420, as it is unlikely that the opening of the CPV will coincide with a time when pressure across the CPV in terms of pressure oscillations is greatest, the CPV may be commanded fully open without attempting to time the opening with a time when pressure oscillations across the CPV are lowest. However, in another example, while not explicitly illustrated, it may be understood that the controller may first determine the frequency, amplitude and phase of pressure oscillations across the CPV as discussed above at step 335, and may then control CPV opening to coincide with a low pressure difference across the CPV in terms of the pressure oscillations. In this way, it may be ensured that the opening of the CPV will not coincide with a point on the pressure oscillation wave where pressure across the CPV is high.

In either case, with the CPV commanded fully open at 100% duty cycle at 420, method 400 may proceed to 425. At 425, method 400 may include indicating whether canister load is below the threshold canister load. Step 425 may be conducted as described above with regard to step 345 of method 300. If at 425 it is indicated that canister load is below the threshold canister load, then method 400 may proceed to 430. At 430, method 400 may include discontinuing purging of the canister by commanding closed the CPV. Similar to that discussed at 420, in one example the CPV may be commanded closed without the controller timing the closing of the CPV with a point on the pressure oscillation wave where pressure across the CPV is lowest, as it may be unlikely that the one closing event of the CPV will coincide with a point on the pressure oscillation wave where pressure across the CPV is greatest. However, in other examples, the controller may determine the frequency and phase of pressure oscillations across the CPV as discussed above at step 335, and may then control CPV closing to coincide with a lowest pressure difference across the CPV in terms of the pressure oscillations across the CPV.

With purging discontinued at 430, method 400 may proceed to 435 where vehicle operating conditions are updated. Specifically, updating vehicle operating conditions may include updating a canister purging schedule to reflect the current canister loading state. Method 400 may then end.

Returning to 425, in response to canister loading state not yet being below the threshold canister load, method 400 may proceed to 440. At 440, method 400 may include indicating if conditions are met for discontinuing aggressively purging the canister. For example, if the vehicle is in DFSO mode, in response to a tip-in event where the vehicle operator requests increased engine torque, conditions may no longer be met for aggressively purging the canister. In another example that includes the remote start event, conditions may no longer be met for aggressively purging the canister in response to the vehicle becoming occupied and/or in response to an indication of a request for increased engine torque via a vehicle operator in order to propel the vehicle. If such conditions are not indicated at 440, then method 400 may return to 420 where the CPV may be continued to be commanded fully open at 100% duty cycle, until canister load is below the threshold load. Alternatively, responsive to conditions being met for discontinuing purging at 440, method 400 may proceed to 445. At 445, purging may be discontinued by commanding closed the CPV. Similar to that discussed at 430, in one example the CPV may be commanded fully closed without taking into account frequency and phasing of pressure oscillations across the CPV due to the low likelihood of the CPV being commanded closed when pressure across the CPV in terms of the pressure oscillations is greatest. However, in another example, the controller may determine the frequency and phasing of pressure oscillations across the CPV in order to command closed the CPV at a point on the pressure oscillation wave when pressure across the CPV is lowest.

In either case, with the CPV commanded closed at 445, method 400 may proceed to 450. At 450, method 400 may include updating vehicle operating conditions. For example, because aggressive purging of the canister was discontinued prior to canister load being below the threshold canister load, updating vehicle operating conditions at 450 may include indicating current canister loading state, and updating the canister purging schedule based on the current canister loading state. Method 400 may then end.

While method 400 is depicted as discontinuing purging at 440 in response to an exit from DFSO mode or in response to the vehicle being occupied during a remote start event, it is herein recognized that in another example method 400 may proceed from 440 to step 335 of method 300, without departing from the scope of this disclosure. In other words, rather than discontinuing the purging operation, the CPV duty cycle may be dropped to as high a duty cycle allowable without resulting in engine stability issues, where the CPV opening and closing events are controlled to be synchronous with the lowest pressure differences across the CPV in terms of pressure oscillations across the CPV, as discussed above.

Turning now to FIG. 6, an example timeline 600 for conducting a canister purging operation according to the methods of FIGS. 3-4, is shown. Timeline 600 includes plot 605, indicating whether conditions are met (yes or no) for purging the canister, over time. Timeline 600 further includes plot 610, indicating engine status over time. In this example timeline, the engine may be either be off, or rotating in a forward direction, the forward direction comprising a direction the engine rotates when combusting air and fuel. Timeline 600 further includes plot 615, indicating a status of fuel injection and spark to engine cylinders, over time. Fuel injection and spark may either be provided (on) or not (off). Timeline 600 further includes plot 620, indicating pressure in the intake of the engine, over time. Timeline 600 further includes plot 625, indicating pressure oscillations across the CPV, over time. As discussed above, for canister purging events the pressure oscillations across the CPV are on top of a vacuum across the CPV, thus the pressure oscillations are depicted at being negative (–) or more negative (---) similar to that depicted at FIG. 2. However, it may be understood that such pressure oscillations may alternatively be depicted as illustrated at inset 250 of FIG. 2, without departing from the scope of this disclosure. Dashed line 627 depicts a pressure difference threshold, set as a function of the frequency, phase and amplitude of the pressure oscillations 625, such that the CPV may be timed to open/close at time of low pressure differences as compared to high pressure differences across the CPV. Lines 626 depict time duration when the CPV may be opened/closed to coincide with opening/closing of the CPV, where the time duration is a function of the pressure difference threshold 627. Timeline 600 further includes plot 630, indicating a status of the CPV. The CPV may either be fully open or fully closed, over time. Timeline 600 further includes plot 635, indicating a status of the CVV (fully open or fully closed), over time. Timeline 600 further includes plot 640, indicating a position of the intake throttle, over time. The throttle may be fully open, fully closed, or somewhere between. Timeline 600 further includes plot 645, indicating the loading state of the fuel vapor canister, over time. Canister loading state may increase (+) and decrease (−) over time. Line 646 indicates the threshold canister load where at or below the threshold canister load the canister is considered effectively cleaned of fuel vapors.

At time t0, conditions are indicated to be met for canister purging (plot 605). The engine is rotating in the forward direction (plot 610), and fuel injection and spark is being provided to engine cylinders (plot 615). There is a vacuum in the intake manifold (plot 620) of the engine. There are pressure oscillations across the CPV (plot 625) on top of the vacuum across the CPV. At time t0 the CPV is closed (plot 630), and the CVV is open (plot 635). The throttle is in a position based on driver demand (plot 640), and canister load is high. Thus, at time t0 it may be understood that a canister purging event is already in progress, with the engine combusting air and fuel. The pressure oscillations across the CPV have been determined as described above with regard to step 335 of method 300 and the pressure difference threshold (line 627) has been set. As discussed, the pressure oscillations are a function of engine firing frequency, variable camshaft timing, structural componentry of the engine and purge line, temperature of gas in the intake and purge line, engine load, etc. While not explicitly illustrated, it may be understood that with the engine combusting air and fuel (plot 615), temperature of the exhaust emission control device (e.g. 63) is at or above its operating temperature (e.g. light-off temperature).

Between time t0 and t1, timing of the PWM signal to the CPV is controlled such that a desired duty cycle is attained, while also ensuring that the CPV opening and closing events are timed to coincide with the low pressure differences in terms of the pressure oscillation wave across the CPV. Similar to that depicted at FIG. 5A, lines indicated as 626 depict a range along the pressure oscillation wave for when the CPV can be opened or closed in order to coincide with the low pressure difference across the CPV in terms of the pressure oscillations. In other words, between the two lines denoted as 626, the CPV may be opened or closed in order to coincide with the lowest pressure difference across the CPV in terms of the pressure oscillations. The predetermined time may be adjusted as a function of the frequency, phase and/or amplitude of the pressure oscillations, and may be adjusted in line with adjustments to the pressure difference threshold which may similarly be adjusted based on frequency, phase and/or amplitude of the pressure oscillations. For example, the predetermined time may be shorter in response to the frequency increasing while the predetermined time may be increased in response to the frequency decreasing.

As discussed above, when purging the canister of fuel vapors, the duty cycle of the CPV is generally ramped up over time, and thus it may be understood that between time t0 and t1, the CPV duty cycle comprises one portion of the ramp. In other words, prior to time t0 the CPV duty cycle is less in terms of percentage open time, than in between time t0 and t1. Said another way, the time between time t0 and t1 represents a fraction of the overall canister purging operation. For example, as discussed above with regard to FIG. 5A, CPV duty cycle may be controlled as a function of the pressure oscillation wave such that the desired duty cycle may be achieved while also ensuring the CPV opening and closing events are timed to coincide with the lowest pressure differences across the CPV in terms of the pressure oscillation wave.

Between time t0 and t1, canister loading state decreases in accordance with the vacuum across the CPV drawing fuel vapors from the fuel vapor canister into the engine for combustion.

At time t1, a DFSO event is initiated and thus fuel injection and spark to engine cylinders are discontinued (plot 615). In other words, at time t1, it may be understood that the vehicle operator has released the accelerator pedal to an extent where engine control strategy has discontinued providing fuel and spark to engine cylinders. While not explicitly illustrated, while the DFSO event initiated at time t1 includes stopping providing fuel and spark, intake and exhaust valves continue to operate as prior to the initiation of the DFSO event. In this way, the engine continues to impart a vacuum on the intake manifold and evaporative emissions system.

With the DFSO event initiated at time t1, and with canister purging conditions still indicated to be met, between time t1 and t2, the intake throttle is commanded to the fully closed position (plot 640). In this way, an increased vacuum (plot 620) may be provided to the canister for aggressively purging the canister.

At time t2, the CPV is commanded fully open at a 100% duty cycle. The action of commanding fully open the CPV, commanding fully closed the throttle, and operating the engine in DFSO mode results in a change in pressure oscillations in the purge line (plot 625), however because the CPV is commanded to the 100% duty cycle there is no compensatory control strategy in terms of PWM signal to the CPV in terms of the change in pressure oscillations.

Between time t2 and t3, the canister is aggressively purged as intake manifold vacuum increases, and with the CPV fully open at 100% duty cycle. Accordingly, by time t3, canister load reaches the threshold canister load represented by line 646. It may be understood that in this example timeline, while not explicitly illustrated, temperature of the emission control device (e.g. 63) remained above the light-off temperature for the duration between time t2 and t3. Accordingly, even though the engine is not combusting air and fuel during the DFSO event while the canister is being purged, the purged fuel vapors are converted to less polluting gasses by the emission control device.

At time t3, with the canister load having reached the threshold canister load indicating that the canister is clean, conditions are no longer indicated to be met for canister purging (plot 605). The CPV is commanded fully closed (plot 630). Between time t3 and t4, the throttle is controlled to the position it was in prior to the DFSO event being initiated. At time t4, the controller receives a request for increased engine torque via the vehicle operator depressing the accelerator pedal, and accordingly, fuel injection and spark are resumed being provided to the engine (plot 615). After time t4, the vehicle is propelled via the engine and a canister purging schedule is updated to reflect the current loading state of the canister.

While the above-depicted example methodology and timelines depict controlling the CPV such that opening/closing events are timed to coincide with low pressure differences in terms of pressure oscillations across the valve during purging, it is herein recognized that in some examples it may be desirable to control another valve, namely the fuel tank pressure control valve (TPCV) (e.g. 125), in similar fashion for conducting fuel tank depressurization during select vehicle operational conditions. Such a method will be discussed below at FIG. 7.

Thus, discussed herein a method may comprise sequentially increasing a duty cycle of a canister purge valve over a course of a purging operation to purge fuel vapors stored in a fuel vapor canister to an intake of an engine, while timing opening and closing events of the canister purge valve to coincide with pressure differences lower than a threshold in terms of pressure oscillations across the canister purge valve during the purging operation.

In such a method, the method may further comprise sequentially increasing the duty cycle of the canister purge valve over the course of the purging operation in response to a learning of an amount of fuel vapors being purged to the intake of the engine.

In such a method, the engine may be combusting air and fuel during the purging operation.

In such a method, timing the opening and closing events of the canister purge valve may be via controlling a pulse width modulation signal to the canister purge valve as a function of the pressure oscillations across the canister purge valve.

In such a method, sequentially increasing the duty cycle of the canister purge valve may include adjusting a frequency at which the canister purge valve is opened and closed in order to time the opening and closing events of the canister purge valve to coincide with the pressure differences lower than the threshold in terms of the pressure oscillations across the canister purge valve during the purging operation.

In such a method, the method may further comprise maintaining a desired engine air-fuel ratio during the sequentially increasing the duty cycle of a canister purge valve over the course of the purging operation.

In such a method, the method may further comprise adjusting the timing of the opening and the closing events of the canister purge valve in response to changes in one or more of a frequency, a phase and/or an amplitude of the pressure oscillations across the canister purge valve during the purging operation, to maintain timing the opening and the closing events of the canister purge valve to coincide with the pressure differences lower than the threshold in terms of the pressure oscillations across the canister purge valve during the purging operation. In such an example, the method may further comprise continually updating the frequency, the phase, and the amplitude of the pressure oscillations during the purging operation in order to time the opening and closing events of the canister purge valve to coincide with the pressure differences lower than the threshold in terms of the pressure oscillations across the canister purge valve during the purging operation.

Another example of a method comprises learning an amount of fuel vapors being desorbed from a fuel vapor canister and routed to an intake of an engine during a canister purging operation, and sequentially increasing a duty cycle of a canister purge valve positioned in a purge conduit coupling the fuel vapor canister to the intake of the engine based on learning the amount of fuel vapor being desorbed from the fuel vapor canister, while controlling opening and closing events of the canister purge valve to coincide with low pressure differences across the canister purge valve in relation to a pressure difference threshold across the canister purge valve, the pressure difference threshold set as a function of determined pressure oscillations across the purge valve during the canister purging operation.

In such a method, the method may further comprise commanding the opening and closing events to each occur within a threshold duration of time in relation to the pressure oscillations, the threshold duration of time a function of the pressure difference threshold.

In such a method, sequentially increasing the duty cycle of the canister purge valve may reduce engine stall events and/or engine hesitation events during the canister purging operation.

In such a method, learning the amount of fuel vapors being desorbed from the fuel vapor canister may be via one or more of an exhaust gas sensor and/or temperature changes of the fuel vapor canister during the canister purging operation.

In such a method, the method may further comprise adjusting a frequency at which the canister purge valve is opened and closed while sequentially increasing the duty cycle of the canister purge valve in order to control the opening and the closing events of the canister purge valve to coincide with the low pressure differences across the canister purge valve in relation to the pressure difference threshold across the canister purge valve during the canister purging operation.

In such a method, the method may further comprise adjusting a phase at which the canister purge valve is opened and closed while sequentially increasing the duty cycle of the canister purge valve in order to control the opening and the closing events of the canister purge valve to coincide with the low pressure differences across the canister purge valve in relation to the pressure difference threshold across the canister purge valve during the canister purging operation.

In such a method, the method may further comprise inferring a frequency, a phase, and an amplitude of the pressure oscillations across the canister purge valve during the canister purging operation based on one or more of at least an engine speed, an engine load, a timing of opening and/or closing of intake and/or exhaust valves of the engine, and an ambient temperature.

In such a method, the method may further comprise determining the pressure oscillations across the canister purge valve during the canister purging operation based on one or more pressure sensor(s). Accordingly, turning to FIG. 7, a high-level example method 700 is shown for controlling the TPCV to depressurize the fuel system or fuel tank, when conditions are met for doing so. The controlling of the TPCV may be carried out in similar fashion to that discussed above for controlling the CPV during canister purging operations. Such a method may be applicable to vehicles with sealed fuel tanks, such as the fuel tank depicted at FIG. 1, in which the FTIV may be commanded closed to seal the fuel tank from the evaporative emissions system, and where the TPCV may additionally be commanded closed to seal the fuel tank. It may be understood that method 700 may be used to depressurize the fuel tank and route any vapors stemming from the fuel system to engine intake for combustion.

Method 700 will be described with reference to the systems described herein and shown in FIG. 1, though it should be understood that similar methods may be applied to other systems without departing from the scope of this disclosure. Method 700 may be carried out by a controller, such as controller 12 in FIG. 1, and may be stored at the controller as executable instructions in non-transitory memory. Instructions for carrying out method 700 and the rest of the methods included herein may be executed by the controller based on instructions stored on a memory of the controller and in conjunction with signals received from sensors of the engine system, such as the sensors described above with reference to FIG. 1. The controller may employ actuators such as fuel injectors (e.g. 45), spark plugs (e.g. 53), first oil pressure-controlled actuator (e.g. 183), second oil pressure-controlled actuator (e.g. 184), CPV (e.g. 92), CVV (e.g. 87), FTIV (e.g. 85), throttle (e.g. 42), TCPV (e.g. 125), etc., to alter states of devices in the physical world according to the methods depicted below.

Method 700 begins at 705 and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to step 710, method 700 includes indicating whether conditions are met for fuel tank (or fuel system) depressurization. Conditions being met may comprise one or more of the following. For example, conditions being met for fuel tank depressurization may include an indication that fuel tank pressure is greater than a threshold pressure. The threshold pressure may comprise a preset threshold pressure, for example. Conditions being met at 710 may in some examples include an indication that the canister is clean (canister loaded less than 5% full, or less than 10% full), because the canister purge valve may be commanded open 100% in order to route fuel vapors to engine intake for combustion. Conditions being met at 710 may include an indication that the engine is in operation combusting air and fuel. Conditions being met at 710 may include an indication that the exhaust catalyst (e.g. 63) is at or above its operating temperature, or light-off temperature.

If, at 710, conditions are not indicated to be met for conducting the fuel tank depressurization routine, then method 700 may proceed to 715. At 715, method 700 may include maintaining current vehicle operating conditions. For example, the fuel tank may be maintained sealed, engine operation may continue as per driver demand, etc. Method 700 may then end.

Returning to 710, in response to conditions being met for fuel tank depressurization, method 700 may proceed to 720. At 720, method 700 may include commanding the CPV to 100% duty cycle. In other words, the CPV may be commanded to a fully open position. Continuing to 725, method 700 may include determining the frequency, phasing, and amplitude of pressure pulsations at the TPCV.

Similar to that discussed above for the CPV, pressure oscillations across the TPCV may vary based on several factors. One such factor is forcing frequency, or engine firing frequency. Engine forcing frequency may vary with engine speed. Another such factor relates to phasing/timing changes when VCT is used to alter intake valve timing. Another such factor may be related to whether standing waves develop or are present in the fluidically coupled fuel system and evaporative emissions system (including the conduit that connects the evaporative emissions system to engine intake). A further such factor relates to temperature of gas in the fuel system/evaporative emissions system, as temperature affects the speed and propagation of pressure waves.

As mentioned above with regard to FIG. 3, engine speed (RPM) may be determined via the crankshaft position sensor (e.g. 197). Engine load may be determined at least based on engine speed, mass air flow as determined via the MAF sensor (e.g. 58) and position of the throttle (e.g. 42). Cam timing may be determined based on position sensors (e.g. 98, 99) configured to determine position of intake and exhaust valve actuators (e.g. 83, 84), and may be a function of a schedule for controlling the first oil pressure-controlled actuator (e.g. 183) that regulates rotation of the intake camshaft (e.g. 181), and a schedule for controlling the second oil pressure-controlled actuator (e.g. 184) that regulates rotation of the exhaust camshaft (e.g. 182). Ambient temperature may be determined via the ambient air temperature sensor (e.g. 107), firing frequency may be inferred based on fuel injection schedule and spark schedule, and temperature of gas in the intake and purge line may be indicated via the intake temperature sensor (e.g. 109).

Many of the above variables may be cross-correlated with one another. For example, variable cam timing may be scheduled as a function of engine speed and load. The engine firing frequency may change in conjunction with engine speed. Thus, based on the information related to the above-mentioned variables being obtained at the controller, pressure oscillations across the TPCV may be inferred since the above-mentioned variables all affect the frequency, phasing, and amplitude of the pressure oscillations across the TPCV.

However, similar to that discussed above at FIG. 3, precisely mapping out the frequency, phasing and amplitude of pressure oscillations across the TPCV based on the above-mentioned variables may be challenging due to the multiple contributing factors. Thus, in one example, a pressure sensor (e.g. 126) may be included in the evaporative emissions system (for example in the conduit between the fuel tank and the canister), and may be used for mapping the frequency, phasing and amplitude of pressure oscillations and/or for feedback control. More specifically, in terms of feedback control the above-mentioned variables that contribute to pressure oscillations across the TPCV may be mapped out as discussed, and the modeled pressure oscillations may be further updated based on feedback from the pressure sensor positioned in the conduit between the fuel tank and the canister. Feedback from the pressure sensor (e.g. 126) may help to refine the model particularly in terms of the phasing of the pressure oscillations.

In another example, the pressure oscillations across the TPCV may be determined based on two pressure sensors, for example the pressure sensor (e.g. 126) positioned in the conduit (e.g. 93) between the fuel tank and the canister, and the FTPT (e.g. 23). For example, pressure oscillations may be determined based on a difference between pressure sensor (e.g. 126) and FTPT (e.g. 23) minus an offset, the offset, the offset comprising a modeled restriction in the canister's buffer (e.g. 90a) region.

It may be understood that any one or more of the above-mentioned approaches may be used, alone or in combination, to determine the frequency, phasing and amplitude of the pressure oscillations across the CPV.

With the frequency and phasing (and amplitude) of the pressure oscillations across the TPCV having been determined at 725, method 700 may proceed to 730. At 730, method 700 may include synchronizing TPCV opening/closing events, or in other words synchronizing the PWM signal to the TPCV, with the frequency and phasing of the pressure oscillations determined at 725. Similar to that discussed above at FIG. 3, synchronizing the PWM signal to the TPCV may include commanding opening and closing events of the TPCV to coincide with low pressure differences across the TPCV in terms of the pressure oscillations across the TPCV. Thus, a pressure difference threshold similar to that discussed at FIGS. 2-3 may be set, such that it may readily be determined when the TPCV may be commanded open/closed to coincide with the low pressure differences across the TPCV as compared to high pressure differences.

As discussed above, fuel system depressurization events may comprise a strategy where a duty cycle of the TPCV is ramped up over time, as a function of feedback from the exhaust gas sensor in order to maintain a desired air-fuel ratio during the purging so as to avoid drivability issues. Thus, while not explicitly illustrated, at 730 it may be understood that synchronizing TPCV opening/closing events may include ramping up an amount of fuel vapor that is routed to engine intake for combustion, over time, similar to that discussed above regarding the CPV. Specifically, the concepts discussed above with regard to FIGS. 5A-5D relate similarly to the TPCV, and thus for brevity the concepts will not all be further described. However, it may be understood that, similar to the CPV, controlling the TPCV to open/close at times when pressure across the TPCV is low in terms of pressure pulsations across the TPCV may include altering frequency, phasing, and duty cycle of the TPCV to ramp up the amount of vapors directed to engine intake over the course of the fuel system depressurization event. In this way, by ramping up the amount of vapors directed to engine intake over time, opportunity for engine hesitation and/or stall due to inhalation by the engine of an overly rich mixture, may be reduced or avoided.

Proceeding to 735, method 700 may include indicating whether fuel tank pressure is below a predetermined threshold pressure. For example, the predetermined threshold may comprise a pressure that is within a threshold (e.g. within 10% or less, or within 5% or less) of atmospheric pressure. If the fuel tank pressure has not yet reached the predetermined threshold, then method 700 may include continuing to determine the frequency, phasing and amplitude of the pressure pulsations across the TPCV. In other words, frequency, phase and amplitude of the pressure pulsations may continually change depending on driver demand, and accordingly, in order to synchronize the TPCV opening and closing events to points of low pressure across the TPCV as compared to high pressure, the frequency, amplitude and phasing of the pressure oscillations may also have to be continually updated until the fuel tank pressure has reached the predetermined threshold pressure.

In response to the fuel tank pressure being indicated to be less than or equal to the predetermined threshold pressure, method 700 may proceed to 740, where the CPV and TPCV may be commanded closed. Proceeding to 745, method 700 may include updating vehicle operating conditions, to reflect the recent fuel tank depressurization routine. For example, updating vehicle operating conditions may include updating a canister loading state, updating fuel system pressure, etc. Method 700 may then end.

Turning now to FIG. 8, an example timeline 800 for conducting a fuel tank depressurization routine, according to the method depicted at FIG. 7, is shown. Timeline 800 includes plot 805, indicating whether conditions are met for depressurizing the fuel tank (yes), or not (no), over time. Timeline 800 further includes plot 810, indicating engine status, over time. In this example timeline, the engine may be rotating in a forward direction, or may be off. Timeline 800 further includes plot 815, indicating whether fuel injection and spark are being provided to engine cylinders (on) or not (off), over time. Thus, it may be understood that when the engine is rotating in the forward direction (plot 810), with fuel injection and spark being provided (on), then the engine is combusting air and fuel. Timeline 800 further includes plot 820, indicating pressure in the intake manifold of the engine. Pressure may be, in this example timeline, atmospheric pressure or less than atmospheric (vacuum). Timeline 800 further includes plot 825, indicating determined pressure pulsations across the TPCV, over time. The pressure pulsations may increase (+) such that the pressure difference is greater, or may decrease (−) such that the pressure difference is lower. Thus, in this example timeline, the pressure oscillations are depicted in similar fashion as inset 250, where the pressure oscillations are simply depicted as being greater or lesser, over time. At times when pressure oscillations are not relevant and/or not requested to be known, then the pressure oscillations may not be applicable (n/a), and when not applicable, plot 825 is represented as a dashed line, as opposed to a solid line. Double lines 826 are used to illustrate that points of low pressure in terms of the pressure oscillations correspond to opening/closing events of the TPCV at plot 830. A pressure difference threshold 827 may be set based on the frequency, phasing and amplitude of the pressure oscillations, such that the controller may be able to time TPCV opening and closing events to coincide with low pressure differences 828 as compared to high pressure differences 829 across the TPCV. Only one set of double lines 826 are indicated, and stars are used to indicate when TPCV opening/closing events occur in relation to the pressure pulsations across the TPCV. Accordingly, plot 830 depicts TPCV status (open or closed), over time.

Timeline 800 further includes plot 835, indicating a status of the CPV, and plot 840, indicating a status of the CVV, over time. For both plot 835 and plot 840, the valves may be either open or closed, over time. Timeline 800 further includes plot 845, indicating a loading state of the fuel vapor storage canister, over time. Canister load may either increase (+) or decrease (−), over time. Timeline 800 further includes plot 850, indicating fuel tank pressure, over time. Fuel tank pressure may either increase (+) or decrease (−), over time.

At time t0, conditions are not yet met for fuel tank pressure relief (plot 805). The engine is combusting air and fuel (see plots 810 and 815), and engine intake manifold vacuum is below a threshold vacuum, represented by dashed line 821. With engine intake manifold vacuum being below the threshold vacuum, it may be understood that fuel vapors may be drawn from the fuel tank to engine intake. Pressure pulsations across the TPCV have not yet been determined (plot 825), as conditions have not yet been met for conducting the fuel tank depressurization routine. The CPV is closed (plot 835), and the CVV is open (plot 840). Canister load is low (plot 845), being below the threshold canister load (e.g. below 10% full of vapors, or below 5% full of vapors, etc.), the threshold canister load represented by dashed line 846. Furthermore, there is positive pressure (+) in the fuel tank (plot 850) as compared to atmosphere, although because fuel tank pressure is below a first fuel tank pressure threshold (represented by dashed line 851), conditions for fuel tank pressure relief are not yet indicated to be met (see plot 805).

At time t1, fuel tank pressure (plot 850) rises above the first fuel tank pressure threshold (line 851). Accordingly, it is determined at time t1 that conditions are met for conducting the fuel tank depressurization routine (plot 805), and the CPV is commanded open. Between time t1 and t2, pressure pulsations across the TPCV are determined, as discussed above with regard to step 725 of method 700. At time t2, the pressure pulsations have been determined, and between time t2 and t3, the TPCV is controlled to time opening and closing events in line with time of low pressure in terms of the pressure oscillations, represented as stars. The TPCV is controlled accordingly between time t2 and t3.

At time t3, the timing of opening and closing events is altered (e.g. frequency and phasing altered) in order to route a greater amount of vapors from the fuel tank to engine intake. In other words, the duty cycle of the TPCV is increased, beginning at time t3. While not explicitly illustrated, it may be understood that increasing the duty cycle is in response to the exhaust gas sensor being used to estimate the concentration of fuel vapors stemming from the fuel tank, such that air-fuel ratio may be controlled to prevent engine hesitation and/or stall and to maintain desired air-fuel ratio during the depressurization event. The TPCV is controlled as such for the duration of time between time t3 and t4. At time t4, the timing of opening and closing events is once again altered so as to further increase the duty cycle of the TPCV to allow for further fuel tank depressurization. Once again, the altering of the timing is in response to the exhaust gas sensor being used to estimate a fuel vapor concentration stemming from the fuel tank, such that it is determined that the duty cycle can be increased without a great risk for engine stall or hesitation.

Between time t4 and t5, fuel tank pressure continues to decline, and at time t5, fuel tank pressure reaches the second fuel tank pressure threshold. With fuel tank pressure having reached the second fuel tank pressure threshold, conditions are no longer indicated to be met for fuel tank pressure depressurization (plot 805). Accordingly, the CPV is commanded closed (plot 835), as is the TPCV (plot 830). After time t5, it is no longer applicable to measure pressure pulsations across the TPCV (plot 825).

While the above methodologies relate to timing CPV or TPCV opening/closing events to coincide with low pressure differences across those valves in terms of pressure oscillations, it is herein recognized that there may be opportunity to at least transiently time opening and closing of the CPV (and in some cases the TPCV), to coincide with high pressure differences in terms of pressure oscillations, which may result in the valve being cleaned. The description below relates to conducting such a cleaning operation of the CPV, however it may be understood that similar methodology may equally apply to the TPCV, without departing from the scope of this disclosure.

Returning to FIG. 3, in response to CPV cleaning being requested at 332, method 300 may proceed to FIG. 9. At 905, method 905 includes determining the frequency, amplitude and phase of pressure oscillations across the CPV, in the same manner as was previously discussed for step 335 of method 300. Accordingly, a pressure difference threshold may be set, similar to that discussed at FIG. 3, to differentiate between high and low pressure differences in terms of the pressure oscillations across the CPV. Next, method 900 may proceed to 910, where CPV opening and closing times are first synchronized to low pressure differences across the CPV in terms of the pressure oscillations. In other words, step 910 may be conducted in similar fashion as step 340 of method 300. In this way, the canister may begin being purged with CPV opening and closing events timed to coincide with low pressure differences in terms of the pressure oscillations across the CPV, similar to that discussed at FIG. 3. The CPV may be controlled in such fashion for a predetermined time duration, a predetermined number of opening and/or closing events, etc.

Proceeding to 915, method 900 may include transitioning the CPV opening/closing events to be timed to coincide with high pressure differences across the CPV in terms of the pressure oscillations, instead of with the low pressure differences. By timing the CPV opening/closing events to coincide with high pressure differences across the CPV, carbon deposits, dust, debris, etc., which may be preventing the CPV from closing as expected or desired, may be dislodged, thus resulting in the CPV once again properly sealing. This action of timing the CPV opening/closing events may for a short length of time, result in an increase in noise, vibration and harshness (NVH). The CPV may be controlled in such fashion for a predetermined duration of time, for a predetermined number of CPV opening/closing events, etc. It may be understood that, in transitioning from the CPV opening/closing events coinciding with low pressure to CPV opening/closing events coinciding with high pressure in terms of the pressure oscillations, frequency and duty cycle may be maintained the same. An exception is if it is desired to change duty cycle, for example, at a similar time as it is desired to change from timing opening/closing events at low pressure to timing opening/closing events at high pressure differences across the CPV. In such an example, the CPV may be transitioned to a different duty cycle and transitioned from opening/closing at low pressure differences to opening/closing at high pressure differences, simultaneously. Such an example may occur if the duty of the CPV is being ramped up during the course of a canister purging event, as discussed above. The same discussion regarding how to transition from timing opening/closing events to coincide with low pressure differences across the CPV, to timing opening/closing events to coincide with high pressure differences across the CPV, equally applies to transitioning from timing opening/closing events at high pressure differences to timing opening/closing events at low pressure differences in terms of the pressure oscillations across the CPV.

After the CPV has been duty cycled to open and close at times coinciding with high pressure differences across the CPV, for the predetermined duration or number of opening/closing events, etc., method 900 may proceed to 920, where the CPV opening/closing events are once again synchronized to the coincide with low pressure differences across the CPV in terms of the pressure oscillations. Clearly, while not explicitly illustrated, it may be understood that the frequency, phasing and amplitude of the pressure oscillations may change during the conducting of the canister purging/CPV cleaning operation, and accordingly, it may be understood that such parameters may continually be determined and updated so that the timing of opening/closing events of the CPV may be maintained to coincide with either low pressure differences, or high pressure differences in terms of the pressure oscillations.

Proceeding to 925, method 900 may include indicating whether canister load is less than the threshold canister load. Learning of the canister load may be based on the exhaust gas sensor, temperature sensor(s) positioned in the canister, etc., as discussed above with regard to step 345 at FIG. 3. If, at 925, canister load is not below the threshold canister load, then method 900 may proceed to 930. At 930, method 900 may include indicating whether additional cleaning is requested. In some examples, a number of cleaning operations to be conducted during a single purging operation may be stored at the controller, and may be based on a degree to which the CPV was previously indicated to not be functioning as desired. For example, one way in which the CPV may be determined to not be sealing properly may include commanding closed the CVV, commanding closed the CPV, and with the engine combusting air and fuel, indicating if vacuum develops in the fuel system. For example, a pressure sensor (e.g. 126) may be used to monitor vacuum build. If vacuum does build to a level greater than a predetermined negative pressure threshold, then it may be determined that the CPV is not properly sealing, as otherwise engine intake manifold vacuum would not have been expected to reach the fuel system. The level of vacuum attained may be a function of how degraded the CPV is, and may be a function of engine manifold vacuum level. Thus, based on a level of vacuum build in the fuel system over a predetermined time period when conducting such a test, a level to which the CPV is degraded may be indicated. The more degraded (greater the vacuum) the CPV, the more times the cleaning routine may be conducted during a single canister purging event.

Accordingly, at 930, if additional cleaning is requested, method 900 may return to 915, where once again the CPV opening/closing events may be timed to coincide with high pressure differences across the CPV in terms of the pressure oscillations. Alternatively, at 930, if additional cleaning is not requested, then method 900 may return to 920, where CPV opening/closing events may be maintained to coincide with low pressure differences across the CPV in terms of the pressure oscillations.

Returning to 925, in response to canister load being indicated to be less than the threshold canister load, method 900 may proceed to 935. At 935, method 900 may include discontinuing purging of the canister. Discontinuing purging may include commanding the CPV closed. Proceeding to 940, method 900 may include updating vehicle operating conditions. Updating vehicle operating conditions may include updating the loading state of the canister, and may further include scheduling a follow-up test to determine whether the cleaning routine conducted on the CPV, resulted in the CPV once again sealing properly, as expected.

Accordingly, turning now to FIG. 10, a high-level example method 1000 for determining whether a CPV cleaning routine, as discussed at FIG. 9, successfully resulted in the CPV once again sealing as expected or desired, is shown. Method 1000 will be described with reference to the systems described herein and shown in FIG. 1, though it should be understood that similar methods may be applied to other systems without departing from the scope of this disclosure. Method 1000 may be carried out by a controller, such as controller 12 in FIG. 1, and may be stored at the controller as executable instructions in non-transitory memory. Instructions for carrying out method 1000 and the rest of the methods included herein may be executed by the controller based on instructions stored on a memory of the controller and in conjunction with signals received from sensors of the engine system, such as the sensors described above with reference to FIG. 1. The controller may employ actuators such as fuel injectors (e.g. 45), spark plug (e.g. 53), CPV (e.g. 92), CVV (e.g. 87), FTIV (e.g. 85), throttle (e.g. 42), TCPV (e.g. 125), etc., to alter states of devices in the physical world according to the methods depicted below.

Method 1000 begins at 1005 and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 1010, method 1000 includes indicating whether a CPV cleaning routine has been recently conducted, for which the success of the cleaning routine has not yet been ascertained. If not, method 1000 may proceed to 1015, where current vehicle operating conditions may be maintained without conducting a CPV diagnostic to ascertain whether the CPV cleaning routine was successful or not. Method 1000 may then end.

Returning to 1010, if the CPV cleaning diagnostic was recently conducted for which a CPV diagnostic test to determine whether the cleaning routine was successful or not is scheduled (but not yet conducted), then method 1000 may proceed to 1020. At 1020, method 1000 may include indicating whether conditions are met for conducting the CPV diagnostic. Conditions being met at 1020 may include one or more of the following. Conditions being met may include an indication that the engine is in operation, combusting air and fuel. Conditions being met may include an indication of an engine intake manifold vacuum greater than a predetermined threshold vacuum, the threshold vacuum comprising a vacuum sufficient to conduct the diagnostic. Conditions being met at 1020 may include steady-state conditions, for example engine idle or steady-state cruising conditions to avoid fuel slosh events, etc. Conditions being met at 1020 may include an indication of an absence of undesired evaporative emissions stemming from the vehicle fuel system and/or evaporative emissions system.

If, at 1020, conditions are not yet met for conducting the CPV diagnostic, method 1000 may proceed to 1025. At 1025, method 1000 may include maintaining current vehicle operating conditions until conditions are met for conducting the CPV diagnostic.

In response to conditions being indicated to be met for conducting the CPV diagnostic at 1020, method 1000 may proceed to 1030. At 1030, method 1000 may include commanding closed the CVV, and commanding closed the CPV. Proceeding to 1035, method 1000 may include monitoring fuel system vacuum for a predetermined duration. In one example, the pressure sensor (e.g. 126) positioned between the FTIV and the canister may be utilized to monitor fuel system vacuum. In this way, the fuel tank may be maintained sealed for the CPV diagnostic. In other examples, the FTIV may be commanded open, and the FTPT (e.g. 23) may be relied upon for monitoring fuel system vacuum.

Continuing to 1040, if the fuel system vacuum is not indicated to be greater than a predetermined threshold vacuum, then method 1000 may proceed to 1045, where it may be indicated that the CPV is functioning as desired. In other words, it may be indicated that the CPV cleaning operation was successful in that it restored the ability of the CPV to seal as expected. Said another way, the CPV sealing as expected includes the CPV preventing engine manifold vacuum from drawing a vacuum on the fuel system, when the CPV is closed. With the CPV indicated to be functioning as desired, the CVV may be commanded open. Proceeding to 1050, vehicle operating parameters may be updated. For example, updating vehicle operating parameters may include removing a flag that was previously set at the controller to indicate a pending status as to whether the CPV is functioning as desired. More specifically, the vehicle may illuminate a malfunction indicator light (MIL) for a degraded CPV after the CPV fails to pass a CPV diagnostic twice (corresponding to two trips or drive cycles). Thus, in response to a first attempt at diagnosing the CPV where the CPV doesn't pass, a MIL may not be illuminated, but a flag may be set at the controller. If the CPV then fails another diagnostic to determine whether the CPV is degraded, then the MIL may be illuminated, notifying the driver of a request to service the vehicle. However, a cleaning operation conducted on the CPV as discussed at FIG. 9 may result in the CPV being cleaned. Thus, in such a case, the initial flag may be removed, such that the next time the CPV doesn't pass a diagnostic test, the MIL is not automatically illuminated. Method 1000 may then end.

Returning to 1040, in response to the fuel system vacuum being greater than the predetermined threshold vacuum, method 1000 may proceed to 1055. At 1055, method 1000 may include indicating that the CPV is degraded. In other words, the CPV initially failed a diagnostic which resulted in the CPV being cleaned, and then the CPV again failed the follow-up diagnostic. Accordingly, indicating the CPV is degraded may include illuminating a MIL at the vehicle dash, notifying the vehicle operator of a request to service the vehicle. Furthermore, at 1055, the CVV may be commanded open.

Proceeding to 1050, method 1000 may include updating vehicle operating parameters. For example, as the CPV was indicated to have not been able to be successfully cleaned, the vehicle may be commanded to operate as frequently as possible in an electric-only mode of operation, in order to prevent engine manifold vacuum from being undesirably communicated to the fuel system during engine operation until the issue has been remedied. Method 1000 may then end.

Turning now to FIG. 11, an example timeline 1100 is depicted, illustrating a CPV cleaning operation, conducted in line with the method of FIG. 9. Timeline 1100 includes plot 1105, indicating whether conditions are met for purging of the canister (yes), or not (no), over time. Timeline 1100 further includes plot 1110, indicating whether a CPV cleaning routine is requested (yes), or not (no), over time. Timeline 1100 further includes plot 1115, indicating engine status (on or off), over time. It may be understood that in this example timeline, engine status being on refers to the engine combusting air and fuel. Timeline 1100 further includes plot 1120, indicating engine intake manifold vacuum, over time. Engine intake manifold vacuum may be either near atmospheric pressure (atm), or negative (vac) with respect to atmospheric pressure, over time. Timeline 1100 further includes plot 1125, indicating pressure pulsations or oscillations across the CPV, over time. The pressure oscillations are depicted as negative (–) or more negative (– – –), as the engine manifold is applying a vacuum on the canister, and the pressure oscillations are on top of the engine manifold vacuum applied on the canister. While not shown at FIG. 11, the pressure oscillations may instead be depicted as in the inset 250 of FIG. 2, without departing from the scope of this disclosure. Timeline 1100 further includes plot 1130, indicating CPV status (open or closed), over time. Timeline 1100 further includes plot 1135, indicating CVV status (open or closed), over time. Timeline 1100 further includes plot 1140, indicating canister load, over time. Canister load may increase (+) or decrease (–), over time.

In this example timeline 1100 it may be understood that a purging event is in progress, and that a cleaning routine is requested to be conducted on the CPV. In other words, by time t0, the canister purging is already taking place, and the canister is being purged according to method 900 depicted at FIG. 9 such that a canister cleaning operation is to be conducted during the purging. Accordingly, at time t0, conditions are met for canister purging (plot 1105), as the canister is in the process of being purged, and CPV cleaning is requested during the purge event (plot 1110). The engine is on, combusting air and fuel (pot 1115), and due to the engine operation, there is a vacuum in the intake manifold that is being utilized to purge the canister. The CVV is open (plot 1135), and the canister load is at a particular canister load at time t0. Furthermore, the frequency, phase, and amplitude of pressure oscillations across the CPV has been determined (plot 1125), and the CPV is being controlled accordingly (plot 1130), to time CPV opening and closing events to coincide with low pressure differences across the CPV in terms of the pressure oscillations. Specifically, the stars 1127 depict the instances where CPV opening/closing is timed with the low pressure differences across the CPV in terms of the pressure oscillations. Thus, it may be seen from comparing plots 1125 and 1130 that, between time t0 and t1, the CPV is timed to open and close at times coinciding with low pressure differences across the CPV in terms of the pressure oscillations across the CPV.

At time t1, the cleaning routine commences. Accordingly, the CPV is transitioned from opening/closing at low pressure differences across the CPV, to opening/closing at high pressure differences across the CPV in terms of the pressure oscillations across the CPV. By timing the opening/closing events to the high pressure differences in terms of the pressure oscillations across the CPV, whatever is preventing the CPV from properly sealing may be dislodged. As mentioned above with regard to FIG. 9, the cleaning routine where the CPV opening/closing events are timed to coincide with high pressure differences in terms of the pressure oscillations across the CPV may last a predetermined duration, a predetermined number of opening/closing events, etc. In this example timeline, the CPV cleaning routine lasts from time t1 to time t2.

At time t2, after the cleaning routine has been conducted, the opening/closing events of the CPV are once again timed to coincide with low pressure differences across the CPV in terms of pressure oscillations across the CPV. Controlling the CPV in this way proceeds after time t2. It may be understood that timeline 1100 shows just a portion of the overall canister purging event, and thus, after time t2 there may be one or more additional cleaning events where the CPV is once again transitioned to being opened/closed at times coinciding with high pressure differences across the CPV in terms of the pressure oscillations. The purging operation may continue until the canister is clean, until conditions change such that the canister purging operation is aborted, etc. Furthermore, as timeline 1100 depicts a portion of the overall canister purging operation, it may be understood that in the portion depicted, a ramping up of the purging of vapors is not depicted. However, it may be understood that a ramping up of the amount of fuel vapors routed to engine intake over time may occur during a purging event that also includes the CPV cleaning routine.

While example timeline 1100 depicts the CPV cleaning routine as conducted according to method 900 depicted at FIG. 9, subsequent to the conducting of such a routine it may be desirable to utilize method 1000 depicted at FIG. 10 to assess whether the cleaning routine restored the ability of the CPV to effectively seal off the engine intake from the evaporative emissions system and fuel system. Turning to FIG. 12, an example timeline 1200 is shown, depicting a CPV test diagnostic routine to determine whether a CPV cleaning routine was successful, or not, according to the method of FIG. 10. Accordingly, timeline 1200 includes plot 1205, indicating whether conditions are met for conducting the CPV test diagnostic (yes), or not (no), over time. Timeline 1200 further includes plot 1210, indicating a status of the CPV (open or closed), and plot 1215, indicating a status of the CVV (open or closed), over time. Timeline 1200 further includes plot 1220, indicating pressure in the fuel system, over time. In this example timeline 1200, it may be understood that a pressure sensor (e.g. 126) positioned between the FTIV and the canister is utilized for monitoring pressure. In this way, the fuel system does not first have to be depressurized to conduct the diagnostic, thus reducing fuel vapors routed to the canister from the fuel tank. However, it may be understood that in other examples the fuel tank may be coupled to the evaporative emissions system to conduct the CPV test diagnostic, without departing from the scope of this disclosure (for example in a case where the vehicle system does not include the pressure sensor between the FTIV and the canister). For plot 1220, fuel system pressure may be at atmospheric pressure, or negative (vacuum) with respect to atmospheric pressure. Timeline 1200 further includes plot 1225, indicating whether the CPV cleaning routine previously conducted was successful (yes) or not (no), over time. Until the diagnostic has been completed to determine whether the CPV is functioning as desired, it may not be applicable (n/a) as to whether the cleaning routine previously conducted was successful or not, as the results have not yet been determined.

At time t0, conditions are not yet met for conducting the CPV test. For example, engine manifold vacuum may not be great enough for conducting the CPV test. Accordingly, between time t0 and t1 the CPV is maintained closed, the CVV is maintained open, and pressure in the fuel system as monitored by the pressure sensor (e.g. 126) remains near atmospheric pressure. Because the CPV test diagnostic has not yet been conducted, it is not applicable as yet whether the CPV cleaning routine was successful.

At time t1, conditions are indicated to be met for conducting the CPV test diagnostic. In this example timeline, it may be understood that conditions have become met at time t1 because engine manifold vacuum has become such that the diagnostic may be conducted. Accordingly, the CVV is commanded closed, and the CPV is maintained closed. Between time t1 and t2, pressure does not develop in the fuel system to the predetermined threshold vacuum, represented by dashed line 1221. Accordingly, it is indicated that the CPV cleaning routine was successful (plot 1225), because the CPV no longer is indicated to be compromised in such a way that vacuum may be communicated from engine intake to the fuel system when the CPV is commanded closed. If the cleaning routine were not successful, then it may be understood that the predetermined threshold vacuum (line 1221) would have been expected to have been reached.

Responsive to the indication that the CPV cleaning routine was successful, conditions are no longer indicated to be met for conducting the CPV test diagnostic, and the CVV is returned to the open state.

The above description with regard to conducting cleaning operations was discussed in terms of the CPV. To avoid redundant method figures and for brevity, method figures and timelines are not depicted for conducting cleaning operations on a TPCV that has been determined to be degraded. However, it is herein recognized that a cleaning operation may be conducted in similar fashion as that of the CPV, without departing from the scope of this disclosure. For example, turning to FIG. 7 where method 700 depicts steps for depressurization of a fuel tank by timing TPCV opening/closing events to coincide with low pressure differences across the TPCV, it may be understood that between steps 710 and 720, there may be another step (not shown), that includes a query as to whether TPCV cleaning is requested. If so, then method 700 may proceed to another method similar to that depicted at FIG. 9, where a TPCV cleaning routine may be conducted by transitioning (during the fuel tank depressurization) to commanding open/closed the TPCV at times coinciding with high pressure differences across the TPCV in terms of pressure oscillations across the TPCV. Instead of monitoring canister load (see step 925 of method 900), fuel tank pressure may instead be monitored, such that the fuel tank depressurization may be concluded once fuel tank pressure has reached the predetermined threshold pressure (similar to step 735 of method 700). In this way it may be understood that, during a fuel tank depressurization routine, the fuel tank may be transitioned from timing the opening/closing of the TPCV to coincide with low pressure differences in terms of pressure oscillations across the TPCV, to instead timing the opening/closing of the TPCV to coincide with high pressure differences in terms of pressure oscillations across the TPCV. In this way, the TPCV may be cleaned of any carbon buildup, debris, dust, etc., that may be preventing the TPCV from properly sealing.

Similar to that discussed above with regard to the CPV, after conducting a cleaning routine on the CPV, it may be ascertained as to whether the TPCV cleaning routine was successful, or not. Thus, another diagnostic, termed herein a TPCV test diagnostic, may be scheduled for after a TCPV cleaning routine has been conducted. Such a diagnostic may include, with the engine combusting air and fuel, commanding open the CPV, and commanding closed the FTIV and the TPCV, and monitoring vacuum build in the sealed fuel tank. It may be understood that in order to conduct such a diagnostic, the operational state of the FTIV may have to be known, such that it may be determined prior to conducting the TPCV diagnostic as to whether the FTIV is functioning as desired. If it is known that the FTIV is functioning as desired, then any vacuum build in the sealed fuel system may be attributed to the TPCV not sealing properly. In some examples, rather than relying on engine manifold vacuum, a pump positioned in the evaporative emissions system (for example a pump positioned in the vent line that couples the canister to atmosphere) may be used to generate the vacuum for conducting such a test. Clearly, such a test further relies on the fuel system and evaporative emissions system being free from any sources of undesired evaporative emissions (aside from the potential degraded TPCV).

Still further, while not explicitly illustrated at FIG. 7, it is herein recognized that there may be opportunities to immediately command fully open the TPCV to depressurize the fuel tank, in similar fashion to that discussed in terms of the CPV. More specifically, as discussed above with regard to FIGS. 3-4, remote engine start events and/or DFSO events may allow for the CPV to be immediately commanded fully open (100% duty cycle), without concern of potential issues such as engine hesitation and/or stall. The same applies to the TPCV. For example, while not explicitly illustrated at FIG. 7 it may be understood that in the event of a remote start event where conditions are met for fuel tank depressurization, or in the event of a DFSO event where conditions are met for fuel tank depressurization, the TPCV may be immediately commanded to a 100% duty cycle to rapidly depressurize the fuel tank by routing vapors to engine intake. One caveat is that a temperature of the emissions control device (e.g. 63) may have to be above its light-off temperature. Thus, similar to that discussed in terms of the CPV, if the vehicle is in the process of depressurizing the fuel tank by timing opening/closing events to coincide with low pressure differences across the TPCV in terms of pressure oscillations across the TPCV, and then a DFSO event is initiated, then the TPCV may be immediately commanded to 100% duty cycle. In this way, opening/closing events of the TPCV may be minimized for a fuel tank depressurization Thus, the methods described herein may include determining a first condition that includes a request to purge the fuel vapor canister and in response thereto purging the canister by controlling frequency and phasing of CPV opening/closing events to correspond to instances where pressure differences in terms of pressure oscillations across the CPV are lowest, and determining a second condition (which may not be the first condition) and in response thereto purging the canister at a 100% duty cycle without first purging at lower duty cycles. Many drive cycles are expected to include both the first condition and the second condition, thus rendering it useful to select whether to purge the canister by controlling frequency and phasing of CPV opening/closing to correspond to instances where pressure differences in terms of pressure oscillations across the CPV are lowest, or to purge the canister at a 100% duty cycle. In some examples, the second condition may be initiated during the first condition, and in such a case, the CPV may be transitioned to stop being controlled to open and close when pressure differences in terms of pressure oscillations across the CPV are lowest, and to be instead immediately commanded to a 100% duty cycle which is not dependent on the frequency, amplitude and phasing of the pressure oscillations. In still other examples, the first condition may be initiated during the second condition, and in such a case, the CPV may be transitioned to stop being controlled to a 100% duty cycle and instead may be controlled as in the first condition where the frequency and phasing of the CPV opening/closing events correspond to instances where pressure differences in terms of pressure oscillations across the CPV are lowest, or purging may be discontinued. Instructions stored in memory of the controller may include determining the first condition as compared to the second condition, based on current vehicle operating conditions and in response to information acquired at the controller from various sensors. For example, the first condition may be indicated in response to an indication that fueling and spark is being provided to the engine, that the vehicle is occupied, and that a remote engine start has not been initiated. Alternatively, the second condition may be indicated in response to an indication of a remote start event where the vehicle is unoccupied, or in response to an indication that fueling (and spark) has been discontinued to the engine while the vehicle is in the process of moving with the vehicle occupied.

In this way, a rate at which the CPV in a vehicle becomes degraded may be reduced along with a reduction in NVH issues. Accordingly, customer satisfaction may be improved. Furthermore, by reducing CPV degradation, engine operation may be improved and engine lifetime may be increased. Additionally, when CPVs degrade, there are increased opportunity for undesired evaporative emissions to be released to the environment. For example, in a case where the CPV is degraded to a point where it does not fully close, during refueling events fuel vapors may be routed through the degraded CPV and may be released to atmosphere via the air intake system of the engine. In another example where the CPV is degraded such that it does not open or sticks closed, the canister may not be effectively cleaned in response to a request to purge the canister of fuel vapors. Over time, inability to effectively clean the canister may lead to bleed emissions from the canister as discussed above.

The technical effect is to recognize that there are pressure oscillations across the CPV when there is an overall vacuum applied to the CPV from the engine, and that if the CPV can be timed to open and close in conjunction with points on the pressure oscillation wave that comprise the least or lowest pressure difference across the CPV, then degradation of the CPV may be reduced. Said another way, the technical effect is to recognize that opening and closing the CPV when the pressure difference in terms of a pressure oscillation wave across the CPV during purging events is greatest may contribute greatly to CPV degradation. Thus, by limiting the CPV opening and closing events to when pressure across the CPV in terms of the pressure oscillation wave is lowest, such degradation may be greatly reduced.

A further technical effect is to recognize that there may be one or more options for determining the frequency, amplitude and phasing of the pressure oscillations across the CPV. As discussed, one option includes predicting pressure oscillations from "first principles" based on data retrieved from sensors of the vehicle related to engine speed, engine load, cam timing, ambient temperature, engine firing frequency, temperature of gas in the intake and purge line, etc. The controller may acquire said data from the sensors and feed the data into a model which predicts the frequency, phasing and amplitude of pressure oscillations across the CPV. Additionally or alternatively, a purge line pressure sensor positioned between the CPV and engine intake may be used to infer pressure oscillations across the CPV. In some examples, the purge line pressure sensor may be used for feedback control means in addition to the modeled pressure oscillations, to ensure proper phasing of the pressure oscillations. The timing of opening and closing of the CPV during purging events may thus in some examples be correlated with data retrieved from the purge line pressure sensor related to when pressure across the CPV is lowest in terms of the pressure oscillations across the CPV. In yet another example, a technical effect is to recognize that, additionally or alternatively, existing pressure sensors in the intake (e.g. MAP sensor) and fuel system (FTIV) may be used to infer pressure oscillations across the CPV.

A further technical effect is to recognize that for hybrid vehicles with limited engine run time, effectively purging the canister may be challenging, and thus it is desirable to find opportunities to aggressively purge the canister while also avoiding issues related to opening/closing the CPV when pressure differences across the CPV in terms of pressure oscillations are greatest. Thus, a technical effect is to recognize that there may be certain vehicle operating conditions where the CPV may be immediately commanded to a 100% duty cycle, which serves the purpose of drastically reducing opportunity for opening/closing the CPV when pressure across the CPV in terms of pressure oscillations is greatest, while also aggressively purging the canister. Those conditions may include but may not be limited to remote engine start events, and when the vehicle is operated in DFSO mode. By using the methodology described herein to time CPV opening and closing events to be concurrent with (e.g. within a predetermined time of peak lowest pressure difference) the lowest pressure difference across the CPV in terms of the pressure oscillation wave when the vehicle is not in DFSO mode or in the process of a remote start, and to command the CPV to 100% duty cycle when the vehicle is in DFSO mode or in the process of a remote start, CPV degradation may be reduced and canister purging efficiency may be increased. In turn, customer satisfaction may be improved, engine lifetime may be increased, and release of undesired evaporative emissions to atmosphere may be reduced.

The systems and methods discussed herein may enable one or more systems and one or more methods. In one example a method comprises sequentially increasing a duty cycle of a canister purge valve over a course of a purging operation to purge fuel vapors stored in a fuel vapor canister to an intake of an engine, while timing opening and closing events of the canister purge valve to coincide with pressure differences lower than a threshold in terms of pressure oscillations across the canister purge valve during the purging operation. In a first example of the method, the method further comprises sequentially increasing the duty cycle of the canister purge valve over the course of the purging operation in response to a learning of an amount of fuel vapors being purged to the intake of the engine. A second example of the method optionally includes the first example, and further includes wherein the engine is combusting air and fuel during the purging operation. A third example of the method optionally includes any one or more each of the first through second examples, and further includes wherein timing the opening and closing events of the canister purge valve is via controlling a pulse width modulation signal to the canister purge valve as a function of the pressure oscillations across the canister purge valve. A fourth example of the method optionally includes any one or more or each of the first through third examples, and further includes wherein sequentially increasing the duty cycle of the canister purge valve includes adjusting a frequency at which the canister purge valve is opened and closed in order to time the opening and closing events of the canister purge valve to coincide with the pressure differences lower than the threshold in terms of the pressure oscillations across the canister purge valve during the purging operation. A fifth example of the method optionally includes any one or more or each of the first through fourth examples, and further comprises maintaining a desired engine air-fuel ratio during the sequentially increasing the duty cycle of a canister purge valve over the course of the purging operation. A sixth example of the method optionally includes any one or more or each of the first through fifth examples, and further comprises adjusting the timing of the opening and the closing events of the canister purge valve in response to changes in one or more of a frequency, a phase and/or an amplitude of the pressure oscillations across the canister purge valve during the purging operation, to maintain timing the opening and the closing events of the canister purge valve to coincide with the pressure differences lower than the threshold in terms of the pressure oscillations across the canister purge valve during the purging operation. A seventh example of the method optionally includes any one or more or each of the first through sixth examples, and further comprises continually updating the frequency, the phase, and the amplitude of the pressure oscillations during the purging operation in order to time the opening and closing events of the canister purge valve to coincide with the pressure differences lower than the threshold in terms of the pressure oscillations across the canister purge valve during the purging operation.

Another example of a method comprises learning an amount of fuel vapors being desorbed from a fuel vapor canister and routed to an intake of an engine during a canister purging operation; and sequentially increasing a duty cycle of a canister purge valve positioned in a purge conduit coupling the fuel vapor canister to the intake of the engine based on learning the amount of fuel vapor being desorbed from the fuel vapor canister, while controlling opening and closing events of the canister purge valve to coincide with low pressure differences across the canister purge valve in relation to a pressure difference threshold across the canister purge valve, the pressure difference threshold set as a function of determined pressure oscillations across the purge valve during the canister purging operation. In a first example of the method, the method further comprises commanding the opening and closing events to each occur within a threshold duration of time in relation to the pressure oscillations, the threshold duration of time a function of the pressure difference threshold. A second example of the method optionally includes the first example, and further includes wherein sequentially increasing the duty cycle of the canister purge valve reduces engine stall events and/or engine hesitation events during the canister purging operation. A third example of the method optionally includes any one or more or each of the first through second examples, and further includes wherein learning the amount of fuel vapors being desorbed from the fuel vapor canister is via one or more of an exhaust gas sensor and/or temperature changes of the fuel vapor canister during the canister purging operation. A fourth example of the method optionally includes any one or more or each of the first through third examples, and further comprises adjusting a frequency at which the canister purge valve is opened and closed while sequentially increasing the duty cycle of the canister purge valve in order to control the opening and the closing events of the canister purge valve to coincide with the low pressure differences across the canister purge valve in relation to the pressure difference threshold across the canister purge valve during the canister purging operation. A fifth example of the method optionally includes any one or more or each of the first through fourth examples, and further comprises adjusting a phase at which the canister purge valve is opened and closed while sequentially increasing the duty cycle of the canister purge valve in order to control the opening and the closing events of the canister purge valve to coincide with the low pressure differences across the canister purge valve in relation to the pressure difference threshold across the canister purge valve during the canister purging operation. A sixth example of the method optionally includes any one or more or each of the first through fifth examples, and further comprises inferring a frequency, a phase, and an amplitude of the pressure oscillations across the canister purge valve during the canister purging operation based on one or more of at least an engine speed, an engine load, a timing of opening and/or closing of intake and/or exhaust valves of the engine, and an ambient temperature. A seventh example of the method optionally includes any one or more or each of the first through sixth examples, and further comprises determining the pressure oscillations across the canister purge valve during the canister purging operation based on one or more pressure sensor(s).

An example of a system for a vehicle comprises a canister purge valve positioned in a purge conduit that couples an intake of an engine to a fuel vapor canister; and a controller with computer readable instructions stored on non-transitory memory that when executed, cause the controller to: determine a frequency, a phase, and an amplitude of pressure oscillations across the canister purge valve while duty cycling the canister purge valve to purge fuel vapors stored in the fuel vapor canister to the engine; set threshold pressure differences as a function of the pressure oscillations across the canister purge valve time ranges for controlling when to time opening and closing events of the canister purge valve as a function of the frequency, the phase and the amplitude of the pressure oscillations such that the opening and the closing events coincide with pressure differences across the canister purge valve lower than the threshold pressure differences; control the opening and the closing events of the canister purge valve based on the threshold pressure differences set as the function of the frequency, the phase and the amplitude of the pressure oscillations; and sequentially increase the duty cycle of the canister purge valve while purging fuel vapors stored in the fuel vapor canister to the engine, while also maintaining the opening and the closing events of the canister purge valve to coincide with the pressure differences across the canister purge valve lower than the threshold pressure differences. In a first example of the system, the system further comprises a pressure sensor positioned in the purge conduit; and wherein the controller stores further instructions to determine the frequency, the phase and the amplitude of the pressure oscillations across the canister purge valve based at least in part on feedback from the pressure sensor. A second example of the system optionally includes the first example, and further comprises a manifold pressure sensor positioned in the intake of the engine; a fuel tank pressure transducer positioned in a fuel system that is fluidically coupled to the fuel vapor canister; and wherein the controller stores further instructions to determine the frequency, the phase and the amplitude of the pressure oscillations across the canister purge valve based on a difference between an intake manifold pressure and a fuel system pressure, corrected for an offset that is based on a buffer region of the fuel vapor canister. A third example of the system optionally includes any one or more or each of the first through second examples, and further comprises an exhaust gas sensor; and wherein the controller stores further instructions to learn an amount of fuel vapor being purged from the fuel vapor canister to the engine via the exhaust gas sensor; and sequentially increase the duty cycle of the canister purge valve as a function of the learned amount of fuel vapor being purged from the fuel vapor canister to the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
learning an amount of fuel vapors being desorbed from a fuel vapor canister and routed to an intake of an engine during a canister purging operation; and
sequentially increasing a duty cycle of a canister purge valve positioned in a purge conduit coupling the fuel vapor canister to the intake of the engine based on learning the amount of fuel vapor being desorbed from the fuel vapor canister, while controlling opening and closing events of the canister purge valve to coincide with low pressure differences across the canister purge valve in relation to a pressure difference threshold across the canister purge valve, the pressure difference threshold set as a function of determined pressure oscillations across the purge valve during the canister purging operation, and
adjusting a frequency at which the canister purge valve is opened and closed while sequentially increasing the duty cycle of the canister purge valve in order to control the opening and the closing events of the canister purge valve to coincide with the low pressure differences across the canister purge valve in relation to the pressure difference threshold across the canister purge valve during the canister purging operation.

2. The method of claim 1, further comprising commanding the opening and closing events to each occur within a threshold duration of time in relation to the pressure oscillations, the threshold duration of time a function of the pressure difference threshold.

3. The method of claim 1, wherein sequentially increasing the duty cycle of the canister purge valve reduces engine stall events and/or engine hesitation events during the canister purging operation.

4. The method of claim 1, wherein learning the amount of fuel vapors being desorbed from the fuel vapor canister is via one or more of an exhaust gas sensor and/or temperature changes of the fuel vapor canister during the canister purging operation.

5. A method comprising:
learning an amount of fuel vapors being desorbed from a fuel vapor canister and routed to an intake of an engine during a canister purging operation;
sequentially increasing a duty cycle of a canister purge valve positioned in a purge conduit coupling the fuel vapor canister to the intake of the engine based on learning the amount of fuel vapor being desorbed from the fuel vapor canister, while controlling opening and closing events of the canister purge valve to coincide with low pressure differences across the canister purge valve in relation to a pressure difference threshold across the canister purge valve, the pressure difference threshold set as a function of determined pressure oscillations across the purge valve during the canister purging operation, and adjusting a phase at which the canister purge valve is opened and closed while sequentially increasing the duty cycle of the canister purge valve in order to control the opening and the closing events of the canister purge valve to coincide with the low pressure differences across the canister purge valve in relation to the pressure difference threshold across the canister purge valve during the canister purging operation.

6. The method of claim 1, further comprising:
determining a frequency, a phase, and an amplitude of the pressure oscillations across the canister purge valve during the canister purging operation based on one or more of at least an engine speed, an engine load, a timing of opening and/or closing of intake and/or exhaust valves of the engine, and an ambient temperature.

7. The method of claim 1, further comprising:
determining the pressure oscillations across the canister purge valve during the canister purging operation based on one or more pressure sensor(s).

8. The method of claim 5, further comprising commanding the opening and closing events to each occur within a threshold duration of time in relation to the pressure oscillations, the threshold duration of time a function of the pressure difference threshold.

9. The method of claim 5, wherein sequentially increasing the duty cycle of the canister purge valve reduces engine stall events and/or engine hesitation events during the canister purging operation.

10. The method of claim 5, wherein learning the amount of fuel vapors being desorbed from the fuel vapor canister is via one or more of an exhaust gas sensor and/or temperature changes of the fuel vapor canister during the canister purging operation.

11. The method of claim 5, further comprising:
determining a frequency, a phase, and an amplitude of the pressure oscillations across the canister purge valve during the canister purging operation based on one or more of at least an engine speed, an engine load, a timing of opening and/or closing of intake and/or exhaust valves of the engine, and an ambient temperature.

12. The method of claim 5, further comprising:
determining the pressure oscillations across the canister purge valve during the canister purging operation based on one or more pressure sensor(s).

* * * * *